(12) United States Patent
Abouelenin et al.

(10) Patent No.: US 12,067,565 B2
(45) Date of Patent: Aug. 20, 2024

(54) SYSTEMS AND METHODS RELATING TO TOKENIZATION

(71) Applicant: MASTERCARD INTERNATIONAL INCORPORATED, Purchase, NY (US)

(72) Inventors: Mohamed Abouelenin, San Carlos, CA (US); Anthony Lopreiato, Scarsdale, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 170 days.

(21) Appl. No.: 17/391,704

(22) Filed: Aug. 2, 2021

(65) Prior Publication Data

US 2022/0044252 A1 Feb. 10, 2022

Related U.S. Application Data

(60) Provisional application No. 63/061,605, filed on Aug. 5, 2020.

(51) Int. Cl.
*G06Q 20/38* (2012.01)
*G06Q 20/10* (2012.01)
(Continued)

(52) U.S. Cl.
CPC ..... *G06Q 20/40145* (2013.01); *G06Q 20/102* (2013.01); *G06Q 20/3829* (2013.01);
(Continued)

(58) Field of Classification Search
CPC ........... G06Q 20/40145; G06Q 20/102; G06Q 20/3829; G06Q 20/4016; G06Q 20/407;
(Continued)

(56) References Cited

U.S. PATENT DOCUMENTS 6,327,578 B1 12/2001 Linehan
9,519,901 B1 * 12/2016 Dorogusker ....... G06Q 20/3226
(Continued)

FOREIGN PATENT DOCUMENTS

EP 3059703 8/2016
WO WO2015/013522 1/2015
(Continued)

*Primary Examiner* — Courtney P Jones
*Assistant Examiner* — Christine Dang
(74) *Attorney, Agent, or Firm* — Harness, Dickey & Pierce, P.L.C.

(57) ABSTRACT

Systems and methods for use in tokenization are disclosed. One example method includes receiving a request to provision a biometric for biometric transactions to a payment account where, the request includes a cryptogram associated with a transaction to said payment account and/or a transaction ID for the transaction. The method also includes checking with an issuer whether the payment account is supported for biometric transactions, receiving an indicator of eligibility, and then requesting a biometric from the user. The method further includes receiving biometric data indicative of the user's biometric, and transmitting a request to the issuer to enable biometric transactions for the payment account.

15 Claims, 15 Drawing Sheets

(51) Int. Cl.
*G06Q 20/40* (2012.01)
*H04L 9/32* (2006.01)

(52) U.S. Cl.
CPC ....... *G06Q 20/4016* (2013.01); *G06Q 20/407* (2013.01); *H04L 9/3213* (2013.01); *H04L 2209/56* (2013.01)

(58) Field of Classification Search
CPC .. G06Q 20/045; G06Q 20/353; G06Q 20/367; G06Q 20/3821; G06Q 20/385; G06Q 20/4015; G06Q 20/405; H04L 9/3213; H04L 2209/56
See application file for complete search history.

(56) References Cited

U.S. PATENT DOCUMENTS

| | | |
|---|---|---|
| 11,494,765 B2 | 11/2022 | Tadiparti |
| 2010/0280880 A1 | 11/2010 | Faith et al. |
| 2012/0018506 A1 | 1/2012 | Hammad et al. |
| 2013/0267204 A1* | 10/2013 | Schultz .................. G06F 21/32 455/411 |
| 2015/0032625 A1 | 1/2015 | Dill et al. |
| 2015/0112870 A1 | 4/2015 | Nagasundaram et al. |
| 2015/0127547 A1 | 5/2015 | Powell et al. |
| 2016/0092872 A1 | 3/2016 | Prakash et al. |
| 2017/0161733 A1 | 6/2017 | Koletsky et al. |
| 2017/0270517 A1 | 9/2017 | Vasu et al. |
| 2017/0352026 A1 | 12/2017 | Musil et al. |
| 2018/0145833 A1* | 5/2018 | Lin .......................... G06F 21/32 |
| 2018/0374083 A1 | 12/2018 | Krishnaiah et al. |
| 2019/0019190 A1 | 1/2019 | Agrawal et al. |
| 2019/0087813 A1 | 3/2019 | Wilson |
| 2019/0149541 A1 | 5/2019 | Valenti et al. |
| 2019/0266589 A1 | 8/2019 | Tiwaree et al. |
| 2020/0092283 A1* | 3/2020 | Parkinson ............... G06F 21/44 |
| 2020/0111094 A1 | 4/2020 | Maheshwari et al. |
| 2022/0044251 A1 | 2/2022 | Abouelenin et al. |

FOREIGN PATENT DOCUMENTS

| | | | |
|---|---|---|---|
| WO | WO2015/054697 | 4/2015 | |
| WO | WO2017/117168 | 7/2017 | |
| WO | WO-2019094071 A1 * | 5/2019 | ......... G06F 21/6245 |

* cited by examiner

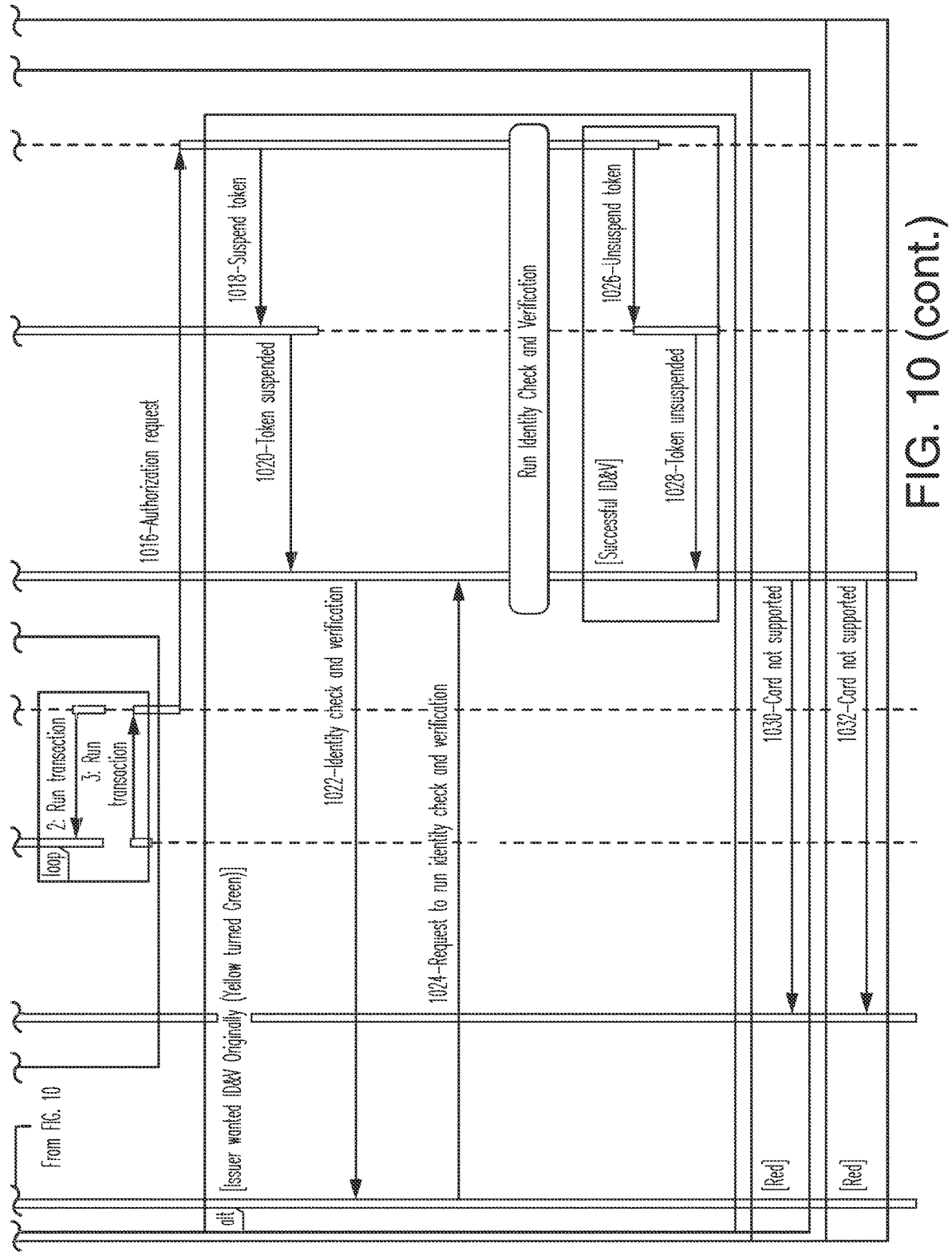

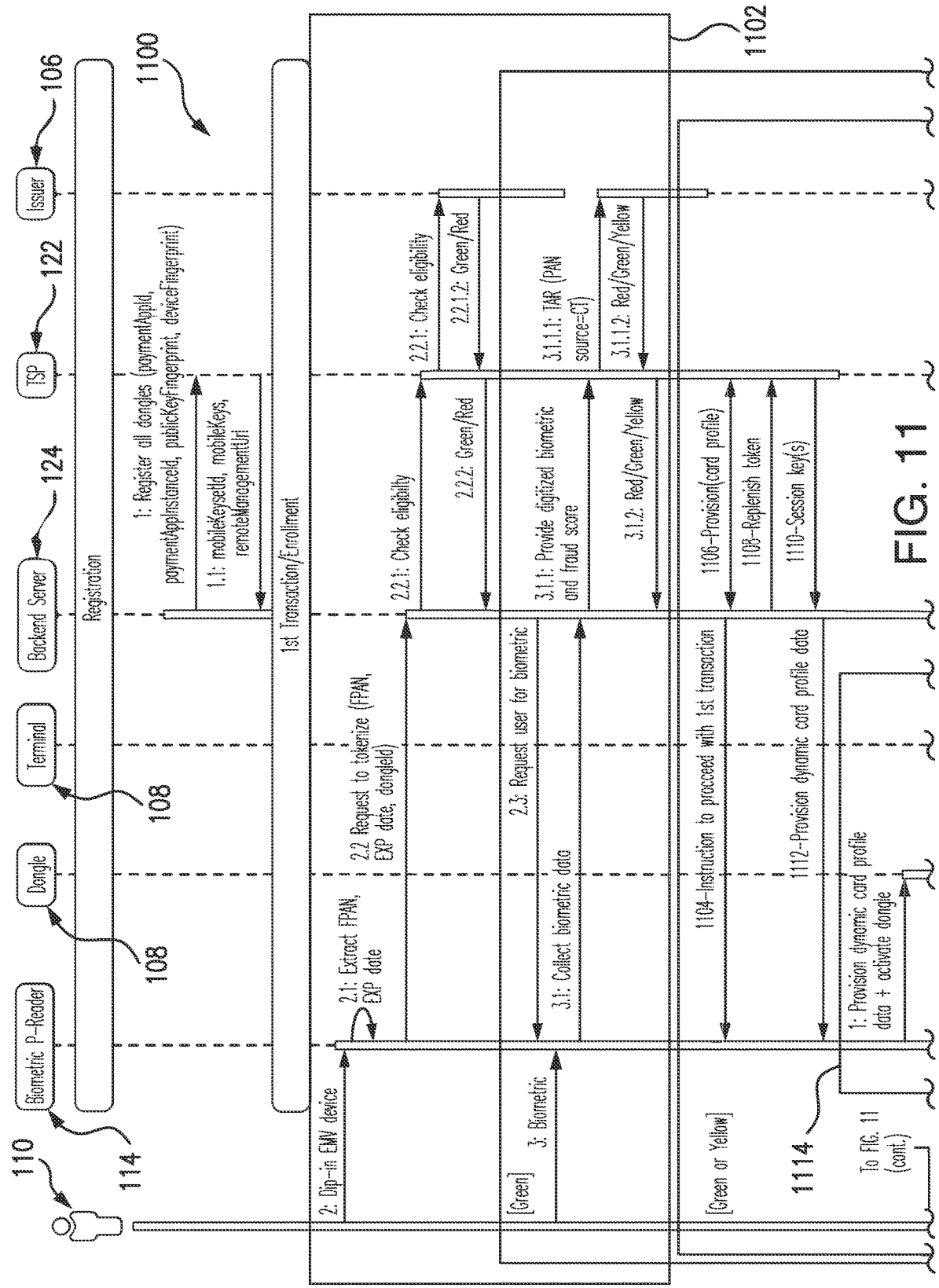

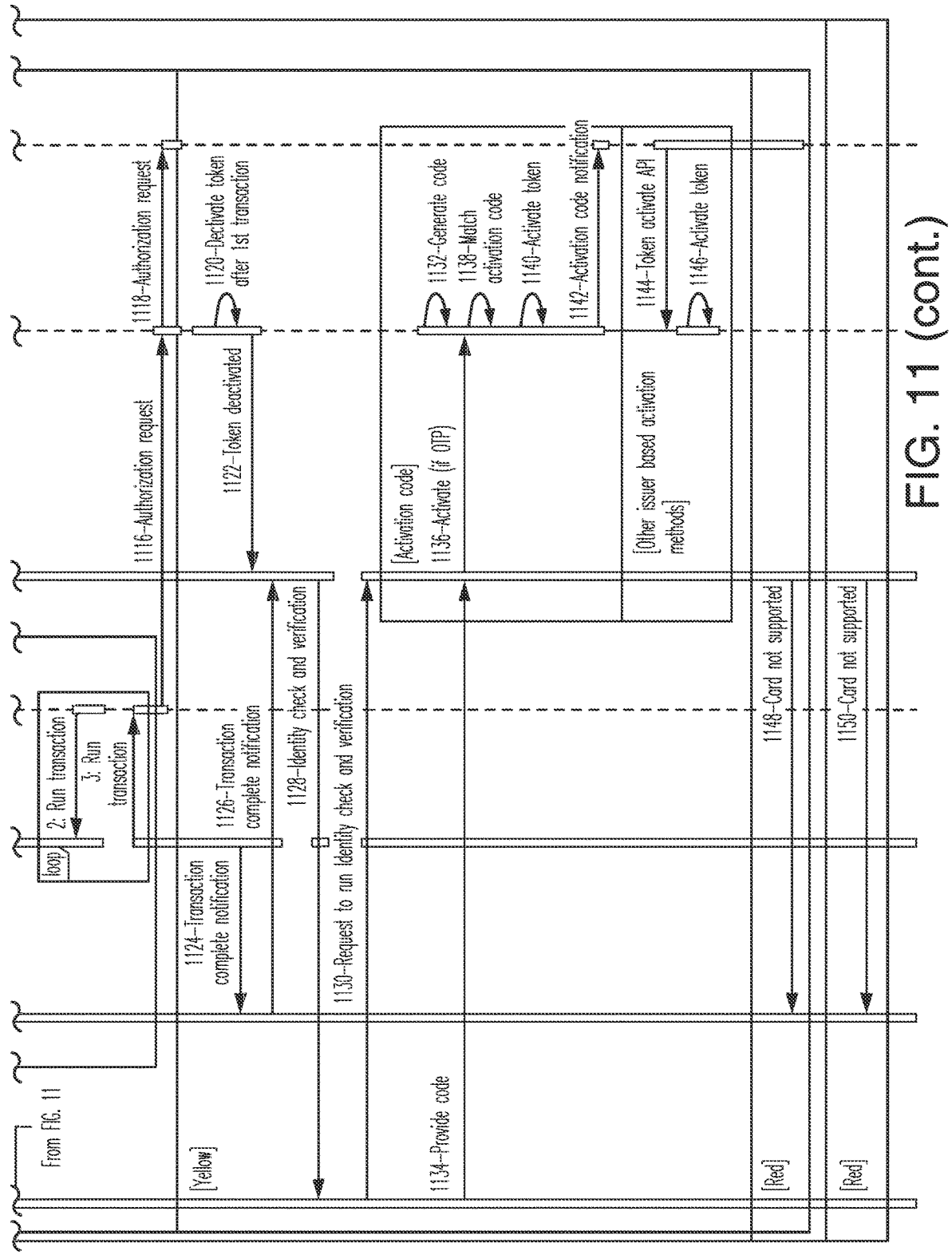

SYSTEMS AND METHODS RELATING TO TOKENIZATION

CROSS-REFERENCE TO RELATED APPLICATION

This application claims the benefit of, and priority to, U.S. Provisional Application No. 63/061,605, filed Aug. 5, 2020. The entire disclosure of the above application is incorporated herein by reference.

FIELD

The present disclosure generally relates to systems and methods for use in tokenization, and more specifically, to systems and methods for use in tokenizing accounts of users for presentment, by the users, to entities based on biometrics and/or devices and/or controls associated with tokens related thereto.

BACKGROUND

This section provides background information related to the present disclosure which is not necessarily prior art.

Users are known to interact with a variety of different entities for a variety of different purposes including, for example, purposes related to commerce. A user, for example, may provide a credit card or debit card to a merchant, in order to fund a transaction at the merchant through an account associated with the card. In doing so, a point-of-sale (POS) terminal of the merchant captures an account number (e.g., a primary account number (PAN), etc.), etc. associated with the card, whereby the transaction can be funded by the associated account.

More recently, accounts may be associated with tokens, for example, via virtual wallets or card-on-file arrangements with merchants. As such, users may present the tokens to the merchants in performing transactions with the merchants, in lieu of cards and/or account numbers (e.g., so that actual account numbers for accounts associated with the users are unknown to the merchants, etc.).

DRAWINGS

The drawings described herein are for illustrative purposes only of selected embodiments and not all possible implementations, and are not intended to limit the scope of the present disclosure.

FIG. 11 is a further example method, suitable for use with the system of FIG. 1, for limiting provisioned token usage, in connection with identification and verification of a user.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

When a payment device (e.g., a card device, a fob device, a communication device (e.g., a smartphone, etc.), etc.) is employed in a transaction at a merchant, the merchant captures a primary account number (PAN) or funding PAN (FPAN) from the payment device and submits the PAN/FPAN to an issuer of the payment device (and corresponding account) in an authorization request for the transaction. Similarly, a user may provision a token to the merchant for use in transactions (for funding by the account), whereby the user enters the PAN and other suitable information from the payment device (e.g., expiration date for the device, verification code (e.g., a card verification code (CVC), etc.), billing address, etc.). The merchant then submits the data to the issuer of the payment device, for example, whereupon a token is issued to the merchant for the user's account/payment device. In both instances, the PAN/FPAN from the payment device is used (to either initiate the transaction or to provision the token).

Further, many accounts are enabled with EMV (Europay, Mastercard, and Visa) type cards (as examples of payment devices), which include security chips (i.e., EMV chips) that interact with POS terminals at merchants to provide enhanced authentication for transactions (contact or contactless) (e.g., as described at www.emvco.com, etc.). When an EMV-enabled card, for example, is linked to a payment account for which a token is provisioned, the provisioning is generally based on the user entering the PAN/FPAN from the card (as described above). As such, the EMV capabilities and/or protections for the account and credit card are omitted from both the provisioning of the token and subsequent transactions using the token.

Uniquely, the systems and methods herein provide for use of EMV capabilities and/or protections of EMV-enabled devices in connection with provisioning tokens for accounts associated with the EMV-enabled devices and/or for use in providing controls associated with the tokens, pending verification of users associated with the EMV-enabled devices.

Figure 1:
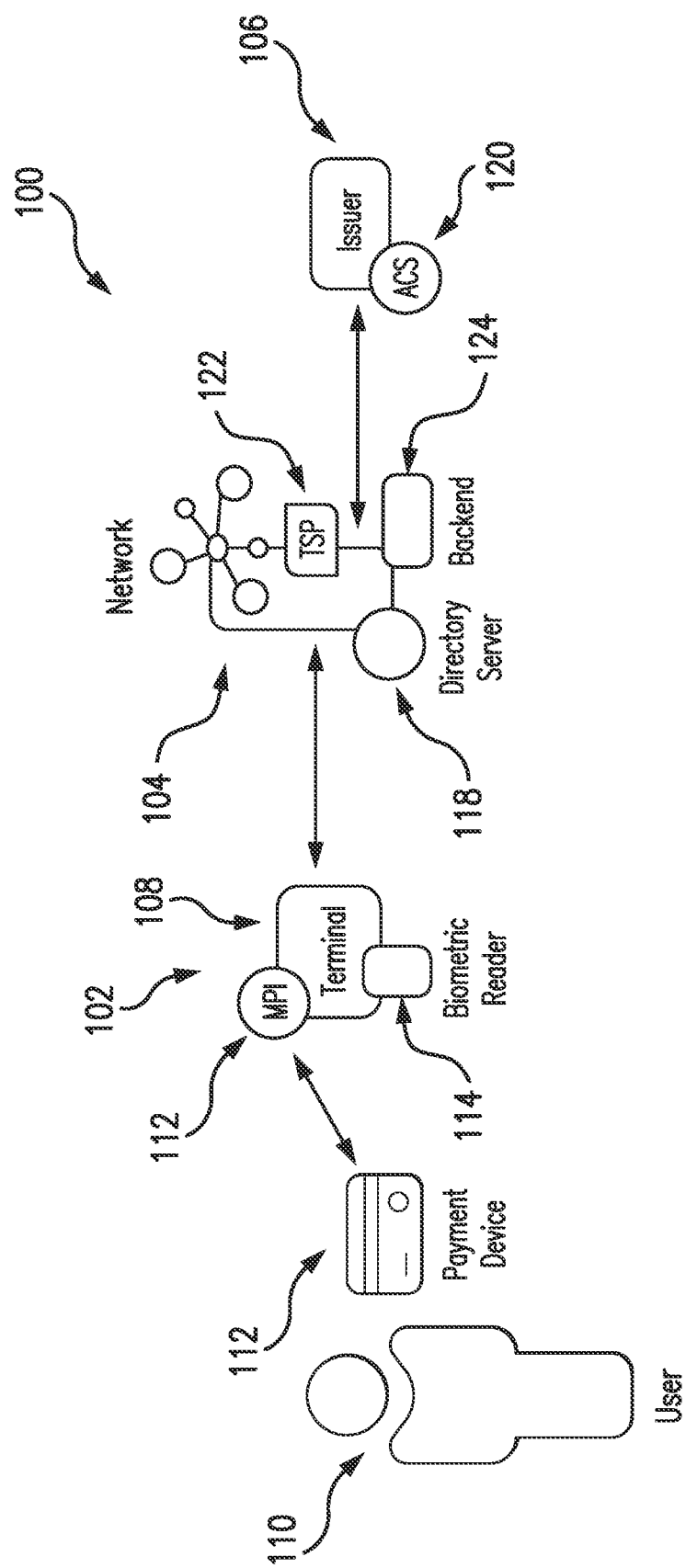
FIG. 1 illustrates an example system of the present disclosure suitable for use in tokenizing payment accounts of users.

FIG. 1 illustrates an example system 100 in which one or more aspects of the present disclosure may be implemented. Although parts of the system 100 are presented in one arrangement, it should be appreciated that other example embodiments may include the same or different parts arranged otherwise depending on, for example, processes for provisioning tokens, processes for authenticating users, types of payment devices and/or networks, types of transactions performed by the users in the system embodiments, etc.

As shown in FIG. 1, the illustrated system 100 generally includes a merchant 102, a payment network 104, and an issuer 106 of payment accounts, each coupled to (and each in communication with) one or more networks, as indicted by the arrowed lines. Each of the one or more networks may include, without limitation, a wired and/or wireless network, a local area network (LAN), a wide area network (WAN) (e.g., the Internet, etc.), a mobile network, and/or another suitable public and/or private network capable of supporting communication among two or more of the illustrated components of the system 100, or any combination thereof. One or more of the networks may further be segregated or separated, whereby, for example, the segregated or separated network(s) may include a private payment transaction network provided by the payment network 104 to the issuer 106, and separately, a public network (e.g., the Internet, etc.) through which the merchant 102 and/or a user 110 communicate, or through which the merchant 102 communicates with, the payment network 104 and/or the issuer 106.

In this example embodiment, the merchant 102 is associated with products offered for sale and sold to the user 110, for example. The merchant 102 may include a physical location, at which the user 110 may browse for different product, and select products to purchase. In FIG. 1, the merchant 102 is represented by a terminal 108 (as a block), which may include a point of sale (POS) terminal or other suitable terminal. The terminal 108, in turn, includes a biometric reader 114. The biometric reader 114 may include, without limitation, a fingerprint reader, a facial image reader, or other suitable biometric reader, etc. Apart from the biometric reader 114, it should be understood that the terminal 108 is configured to interact with an EMV-enabled card, either through contact (e.g., inserting or dipping the card in the terminal 108) or contactless (e.g., through tapping the card, etc.) application, whereby the terminal 108 is configured to provide EMV support, either alone or in communication with the biometric reader 114 which is enabled to provide EMV-enabled operations in this embodiment. The terminal 108 may include this operability internally, or through an external device (e.g., a dongle (not shown), etc.). Related thereto, in this example embodiment, the terminal 108 further includes or is associated with a merchant plug-in or MPI 116 associated with enhanced authentication (e.g., as defined by the EMV specification, etc.). The MPI 116 is described in more detail below.

The issuer 106 includes a banking institution or other financial institution, which has issued an account (e.g., a credit account, a debit account, a prepaid account, etc.) to the user 110, and through which the user 110 is permitted to fund transactions with the merchant 102 and other merchants. The account is associated with an EMV-enabled payment device 112 (illustrated in FIG. 1, without limitation, as a card device), which is consistent with a suitable EMV specification at www.emvco.com, for contact or contactless interactions. As such, the payment device 112 includes an EMV chip (not shown) which configures the payment device 112 to operate as described below. In this example embodiment, the issuer 106 includes and/or is associated with an access control server (ACS) 120, which is associated with enhanced authentication (e.g., as defined by a suitable EMV specification (see, e.g., www.emvco.com, which is incorporated herein by reference), etc.). The ACS 120 is described in more detail below.

The payment network 104 is disposed generally between the merchant 102 and the issuer 106 (and other financial institutions) and is configured to facilitate communication therebetween to permit a network-based transaction between the user 110 and the merchant 102 to be authorized (and between the user and other merchants and other users and the merchant 102). In connection therewith, a transaction between the merchant 102 and the user 110 (as well as other transactions in the system 100) can be facilitated through an authorization request, generated by the merchant 102 and communicated through the payment network 104, as described below, where the authorization request generally abides by the ISO 8583 standard. Once the transaction is authorized, the payment network 104 is further configured to clear and settle the transaction, if approved (e.g., by the issuer 106, etc.), whereby funds are transferred to and from an acquirer (not shown) (on behalf of the merchant 102, for example) and the issuer 106 (on behalf of the user 110, for example) (along with other approved transactions in general facilitated through the payment network 104).

In addition, in this example embodiment, the payment network 104 is further configured to enable enhanced authentication of users in connection with transactions performed by the users. As part thereof, the payment network 104 includes and/or is associated with a directory server 118, where each of the MPI 116, the directory server 118, and the ACS 120 are coupled in communication through one or more of the networks in the system 100. Enhanced authentication in the system 100 is described in more detail below. And also, in this example embodiment, the payment network 104 includes a token service provider (TSP) 122, which is configured to provide token services for accounts. For example, in response to a provisioning request, a token may be generated by the provider 122, and linked back to an account credential for a payment account for later validating the token and mapping the token back to the account credential (e.g., in connection with authorization of a transaction, etc.). The provider 122 may include, for example, Mastercard Digital Enablement Service (MDES), etc.

The user 110 may also be associated with a communication device (not shown), which may include a smartphone, fob, smartwatch, fitness tracker, etc.

While only one merchant 102, one issuer 106, and one user 110 (and one payment device 112) are illustrated in FIG. 1, it should be appreciated that any number of merchants, issuers, and/or users, as described herein, may be included in other embodiments. Likewise, a different number of MPIs, payment networks, directory servers, and ACSs may be included in other system embodiments. In still other embodiments, different merchants may have different acquirers, and different users may employ payment accounts issued by multiple different issuers.

Figure 2:
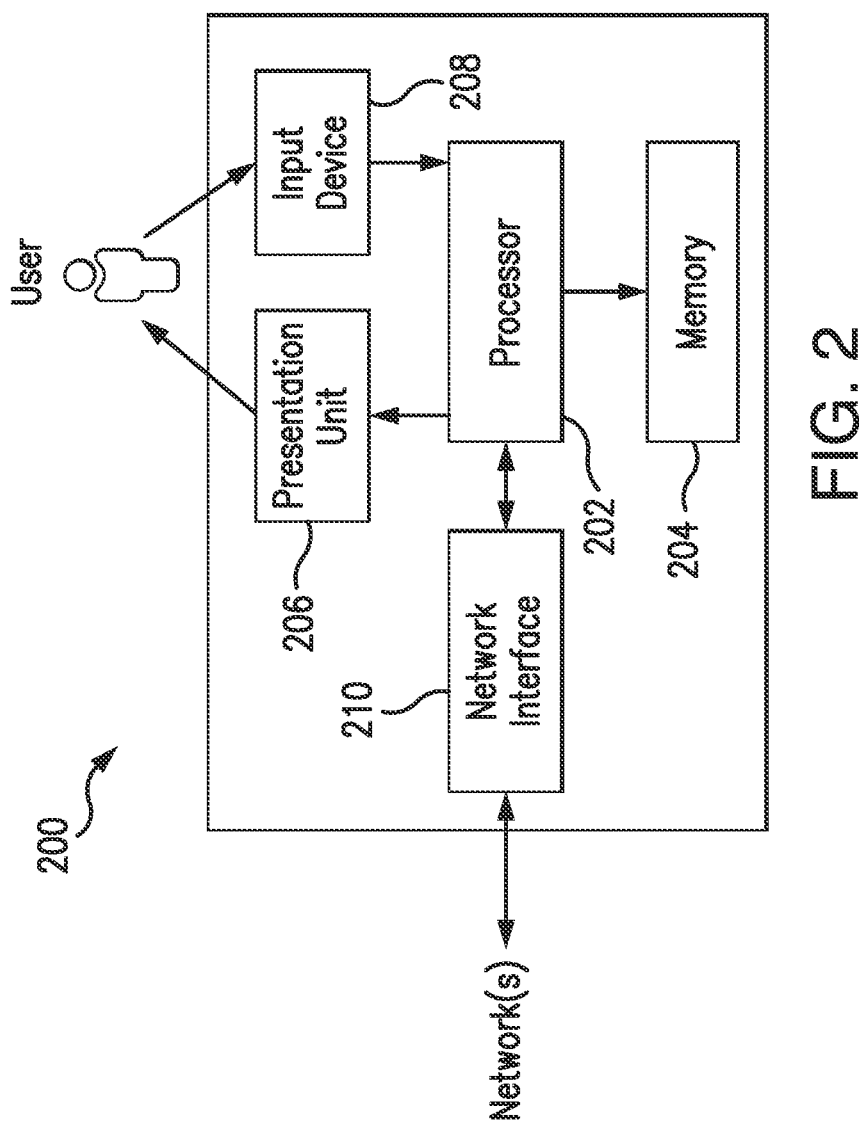
FIG. 2 is a block diagram of an example computing device that may be used in the system of FIG. 1.

FIG. 2 illustrates an example computing device 200 that can be used in the system 100. The computing device 200 may include, for example, one or more servers, workstations, personal computers, laptops, tablets, smartphones, point-of-sale (POS) terminals, payment devices, etc. In addition, the computing device 200 may include a single computing device, or it may include multiple computing devices located in proximity or distributed over a geographic region, so long as the computing devices are specifically configured to function as described herein. In particular, in the example system 100 of FIG. 1, each of the merchant 102, the MPI 116, the payment network 104, the directory server 118, the issuer 106, the ACS 120, and/or the token service provider 122 may include, or may be implemented in, a computing device, such as the computing device 200. In addition, the EMV payment device 112, the biometric reader 114 and the terminal 108 may each be considered a computing device consistent with the computing device 200. That said, the system 100 should not be considered to be limited to the computing device 200, as described below, as different computing devices and/or arrangements of computing devices may be used. In addition, different components and/or arrangements of components may be used in other computing devices.

With reference now to FIG. 2, the computing device 200 generally includes a processor 202, and a memory 204 that is coupled to (and in communication with) the processor 202. The processor 202 may include, without limitation, one or more processing units (e.g., in a multi-core configuration, etc.), including a general purpose central processing unit (CPU), a microcontroller, a reduced instruction set computer (RISC) processor, an application specific integrated circuit (ASIC), a programmable logic device (PLD), a gate array, and/or any other circuit or processor capable of the functions described herein. The above examples are example only, and are not intended to limit in any way the definition and/or meaning of processor.

The memory 204, as described herein, is one or more devices that enable information, such as executable instructions and/or other data, to be stored and retrieved. The memory 204 may be configured to store, without limitation, transaction data, primary account numbers (e.g., PANs, etc.), reference numbers, biometrics, cryptograms, messages, results, and/or other types of data suitable for use as described herein, etc. In addition, the memory 204 may include one or more computer-readable storage media, such as, without limitation, dynamic random access memory (DRAM), static random access memory (SRAM), read only memory (ROM), erasable programmable read only memory (EPROM), solid state devices (e.g., EMV chips, etc.), CD-ROMs, thumb drives, tapes, flash drives, hard disks, and/or any other type of volatile or nonvolatile physical or tangible computer-readable media. It should be appreciated that the memory 204 may include a variety of different memories. In various embodiments, computer-executable instructions may be stored in the memory 204 for execution by the processor 202 to cause the processor 202 to perform one or more of the operations described herein (e.g., one or more of the operations recited in the methods herein, etc.), such that the memory 204 is a physical, tangible, and non-transitory computer-readable media and such that the instructions stored in the memory 204 enable the computing device to operate as (or transform the computing device into) a specific-purpose device configured to then effect the features described herein.

The computing device 200 also includes a presentation unit 206 and an input device 208 coupled to (and in communication with) the processor 202.

The presentation unit 206 outputs information and/or data to a user (e.g., the user 110, other users, etc.) by, for example, displaying, audibilizing, and/or otherwise outputting the information and/or data. In some embodiments, the presentation unit 206 may comprise a display device such that various interfaces (e.g., application screens, webpages, etc.) may be displayed at computing device 200, at the display device, to display such information and/or data, etc. With that said, the presentation unit 206 may include, without limitation, a cathode ray tube (CRT), a liquid crystal display (LCD), a light-emitting diode (LED) display, an organic LED (OLED) display, an "electronic ink" display, speakers, combinations thereof, etc. In addition, the presentation unit 206 may include multiple devices in some embodiments.

The input device 208, when present in the computing device 200, is configured to receive input from the user 110, for example. The input device may include, without limitation, a keyboard, a mouse, a touch sensitive panel (e.g., a touch pad or a touch screen, etc.), another computing device, and/or an audio input device. Further, in some example embodiments, a touch screen, such as that included in a tablet, a smartphone, or similar device, may function as both the presentation unit 206 and the input device 208.

The illustrated computing device 200 further includes a network interface 210 coupled to (and in communication with) the processor 202 and the memory 204. The network interface 210 may include, without limitation, a wired network adapter, a wireless network adapter, a mobile adapter, or other device capable of communicating to one or more different networks (e.g., the Internet, a private or public LAN, WAN, mobile network, combinations thereof, or other suitable networks, etc.). In some example embodiments, the processor 202 and one or more network interfaces may be incorporated together.

With reference again to FIG. 1, the system 100 further includes a backend 124, which is included in the payment network 104 in this embodiment. It should be appreciated, though, that the backend 124 may be included in other parts of the system 100, or as a standalone part of the system 100 (yet in communication with the parts of the system 100) in other embodiments. The backend 124 is configured, by executable instructions, to interact with the parts of FIG. 1 and to operate as described herein.

In connection therewith, the user 110 may desire to provision a token for use in transactions, via a biometric or suitable device (e.g., smartphone, key fob, etc.), etc. As such, the user 110 interacts with the backend 124 to provision the token to the backend 124, generally, whereby the token is linked to the user's payment account issued by the issuer 106 and usable at the merchant 102 (and, potentially, other merchants, etc.). It should be appreciated that various different data flows may be employed to provision the token, whereby the user 110 and the issuer 106, and others, for example, may participate and/or permit the provisioning.

In particular, in one implementation, in response to a dip of the EMV payment device 112, the terminal 108 is configured to generate a cryptogram (e.g., based on one or more session keys, etc.) and to transmit the cryptogram along with the PAN and expiration date for the payment device 112 (and other information associated with the payment account linked to the payment device 112, as desired) to the backend 124 (as part of a request to tokenize the payment account). The backend 124 is configured to submit a request to the token service provider 122, which includes the cryptogram, the PAN, etc.

The token service provider 122 is configured to seek validation of the cryptogram and to determine if the payment account is eligible for tokenization. The token service provider 122 may seek validation from either the payment network 104, for example, or from the issuer 106. When eligible, the token service provider 122 is configured to indicate the eligibility to the backend 124, which, in turn, is configured to solicit a biometric from the user 110 at the terminal 108 (and in particular, the biometric reader 114, etc.). The terminal 108 is configured to collect the biometric data and provide the same to the backend 124. The backend 124 is configured to provide the biometric data (in one format or another) (or merely confirm receipt of the biometric data) to the token service provider 122.

In this implementation, in response, the token service provider 122, then, is configured to submit the tokenization request (TAR) to the issuer 106 (e.g., a request for use of the payment account in biometric transactions, etc.), which may include the cryptogram validation (when performed by the payment network 104), or not (when performed by the issuer 106). The issuer 106 is configured to then permit the tokenization, or not (or indicate otherwise (e.g., by color indicator: green (e.g., approved tokenization request, etc.), red (e.g., declined tokenization request, etc.), yellow (e.g., additional authentication required, etc.), other colors, etc.)), based on the cryptogram validation, and other data as desired or required, and to respond to the token service provider 122. The token service provider 122, in turn, is configured to provision a token to the backend 124, when permitted, or to notify the backend 124 when not permitted. In response, the backend 124 is configured to either store the token (and link the token to the captured biometric data) and inform the user 110 of the tokenization, via the terminal 108, or to inform the user 110 of the tokenization failure, via the terminal 108.

When the user's payment account is tokenized, the user 110 is permitted to perform transactions, funded by the payment account associated with the payment device 112, by presenting the biometric to the terminal 108 or a device in communication with the terminal 108 (e.g., presenting a fingerprint, waving a portion of the user's hand, etc.). In connection therewith, the biometric data is provided by the terminal 108 of the merchant 102 (or another terminal of another merchant) to the backend 124, which is configured to retrieve the token associated with the biometric and return the token to the terminal 108 for initiating a payment account transaction.

In a another implementation of the above, in response to the dip of the EMV payment device 112, the terminal 108 is configured to initiate a transaction to the payment account associated with the payment device 112, via the payment network 104 (e.g., for a minimal amount, for no amount, for an actual transaction amount, etc.), whereby a transaction ID is generated for the transaction and is thereby known to the payment network 104 and the issuer 106 (e.g., via an authorization request generated by the terminal 108 for the transaction, etc.). When the transaction is approved (or potentially, declined), the terminal 108 is configured to separately transmit the transaction ID along with the PAN and expiration date for the payment device 112 (and other information associated with the payment account linked to the payment device 112, as desired) to the backend 124 as part of a request to tokenize the payment account. The backend 124 is configured to submit the tokenization request to the token service provider 122, which includes the transaction ID, the PAN, etc.

In connection therewith, the token service provider 122 is configured to seek validation of the transaction ID and to determine if the payment account is eligible for tokenization. The token service provider 122 may seek validation of the transaction ID from either the payment network 104, for example, or from the issuer 106. When eligible, the token service provider 122 is configured to indicate the eligibility to the backend 124, which, in turn, is configured to solicit a biometric from the user 110 at the terminal 108 (and in particular, the biometric reader 114, etc.). The terminal 108 is configured to collect the biometric data and provide the same to the backend 124. The backend 124 is configured to provide the biometric data (in one format or another) (or merely confirm receipt of the biometric data) to the token service provider 122.

In this implementation, in response, the token service provider 122, then, is configured to submit the tokenization request to the issuer 106, which may include the transaction ID validation (when performed by the payment network 104), or not (when performed by the issuer 106). The issuer 106 is configured to then permit the tokenization, or not (or indicate otherwise (e.g., by color indicator: green, red, yellow, other colors, etc.)), based on the transaction ID validation, and other data as desired or required, and to respond to the token service provider 122 indicating the same. The token service provider 122, in turn, is configured to provision a token to the backend 124, when permitted, or to notify the backend 124 when not permitted. In response, the backend 124 is configured to either store the token (and link the token to the biometric data) and inform the user 110 of the tokenization, via the terminal 108, or to inform the user 110 of the tokenization failure, via the terminal 108.

As above, when the user's payment account is tokenized, the user 110 is permitted to perform transactions, funded by the payment account associated with the payment device 112, by presenting the biometric for capture by the terminal 108 or by a device in communication (e.g., a dongle, etc.) with the terminal 108 (e.g., presenting a fingerprint, providing a facial image, etc.).

It should be appreciated that when a transaction is initiated, from which a transaction ID is generated and identified by different parties, that the transaction ID may be identified by a specific merchant ID. That is, a specific merchant ID or MID may be included in the transaction for provisioning the token, whereby the issuer 106, for example, may identify the transaction ID as associated with a tokenization request based on the MID and store the same for later validation, as indicated above. What's more, when a transaction is initiated, the backend 124, the token service provider 122, or another party may score the transaction, in one manner or another, whereby the backend 124 and/or the token service provider 122 may be configured to provide the score in lieu of, or in addition to, either the cryptogram validation or transaction ID validation. The issuer 106 may then be configured to rely on the score in deciding whether to permit tokenization (or in deciding to only permit use of the token in a first transaction, etc.).

While the implementations above relate to provisioning the token for a biometric of the user 110, it should be appreciated that the tokenization may be associated with a communication device, whereby a device ID, MAC address, IP address, electronic serial number (ESN), etc., as a unique identifier for the communication device, may be used in place of the user's biometric. In this manner, rather than presenting the biometric, the user 110 may wave, tap, and/or connect a communication device at the terminal 108, for example, to initiate a transaction based on the token.

In addition, in connection with the above implementations, it may be desirable to incorporate one or more processes for verification of the user 110 for the tokenization, or not. More specifically, while use of the EMV payment device 112 provides a level of assurance that the user 110 is an authorized user for provisioning a token based on a biometric of the user 110, the issuer 106 and/or other parties may seek to further verify the user 110 (or not, depending on the parties involved). In connection therewith, it may also be desirable to permit the user 110 to perform a number of transactions prior to suspending the token until verification is complete. For example, the issuer 106 may desire to suspend the token (provisioned by the token service provider 122) after a first transaction, a third transaction, a fifth transaction, or more or less, etc. The control may be based on, for example, the color codes included in the response of the issuer 106 to the provisioning eligibility and/or validation (e.g., green, red, yellow, other colors, etc.).

That said, additional verification of the user 110 may be omitted in various embodiments, whereby the token is provisioned (e.g., in response to a green response, etc.) and usable by the user 110 for biometric identity transactions without further verification of the user 110.

Consistent with the above, in a further implementation including controls (or not), the backend 124 is configured to instruct the token service provider 122 to provision a token (when the response from the issuer 106, in response to the request to tokenize, is green (e.g., approved tokenization request, etc.), yellow (e.g., additional authentication required, etc.) or another color, for example, but not red (e.g., declined tokenization request, etc.), etc.), whereby the token service provider 122 is configured to provision the token. The backend 124 may then be configured to instruct the biometric reader 114 (or terminal 108) to proceed with a transaction, using the token.

As part of the transaction (following a green response from the issuer 106, for example), the biometric reader 114 (or terminal 108) may be configured to notify the backend 124 of the transaction (e.g., each transaction, a first transaction, etc.), whereby the backend 124 is configured to suspend the token with the token service provider 122. Thereafter, the backend 124 is configured to instruct the user 110 to perform an identity check and verification (ID&V). When the user 110 requests to do so, the backend 124 is configured to un-suspend the token (i.e., with the token service provider 122) and to initiate a 3D-Secure (or 3DS) non-payment transaction, whereby the ACS 120 is configured to issue a challenge question to the user 110. When the user 110 responds, if correct, the ACS 120 is configured to provide a verification to the backend 124. When verified, the token is permitted to be use for subsequent transactions, but when not verified (after a certain time), the backend 124 is configured to again suspend the token with the token service provider 122. It should be appreciated that while 3DS is employed above, the backend 124 may be configured to employ other verification techniques to verify the user 110 in a similar manner.

Additionally, or alternatively, as part of the transaction (following a green response from the issuer 106), the biometric reader 114 (or terminal 108) may be configured to submit an authorization request for the transaction to the issuer 106, via the payment network 104. The issuer 106, after approving the transaction (or declining the transaction) is configured to suspend the token with the token service provider 122. The token service provider 122 is configured to notify the backend 124 of the suspension. Thereafter, the backend 124 is configured to instruct the user 110 to perform an identity check and verification. When the user 110 requests to do so, the backend 124 is configured to interact with the issuer 106 to verify the user 110, by any suitable technique available to the backend 124 and/or the issuer 106. Once verified, the issuer 106 is configured to un-suspend the token with the token service provider 122. The token service provider 122 is configured to notify the backend 124 of the un-suspension of the token.

Additionally, or alternatively, as part of the transaction (following a yellow (or other color) response from the issuer 106), the biometric reader 114 (or terminal 108) may be configured to submit an authorization request for the transaction to the token service provider 122 (e.g., with the token included therein, etc.), via the payment network 104. The token service provider 122, after including the PAN (or FPAN) in the authorization request and submitted the authorization request to the issuer 106, is configured to suspend the token. The token service provider 122 is further configured to notify the backend 124 of the suspension. Thereafter, the backend 124 is configured to instruct the user 110 to perform an identity check and verification. When the user 110 requests to do so, the token service provider 122 is configured to interact with the backend 124 and/or the issuer 106 to verify the user 110, by any suitable technique (e.g., a one-time-passcode, etc.). Once verified, the token service provider 122 is configured to un-suspend the token and to notify the issuer 106 and/or backend 124 of the un-suspension of the token.

It should be appreciated that when the response from the issuer 106 includes a red color or another indicator of ineligibility, the backend 124 is configured to indicate to the biometric reader 114 or terminal 108 that the payment account associated with the EMV-enabled payment device 112, dipped in the biometric reader 114, does not support biometric identity transactions (or device identity transactions) via tokenization, as described herein.

Figure 3:
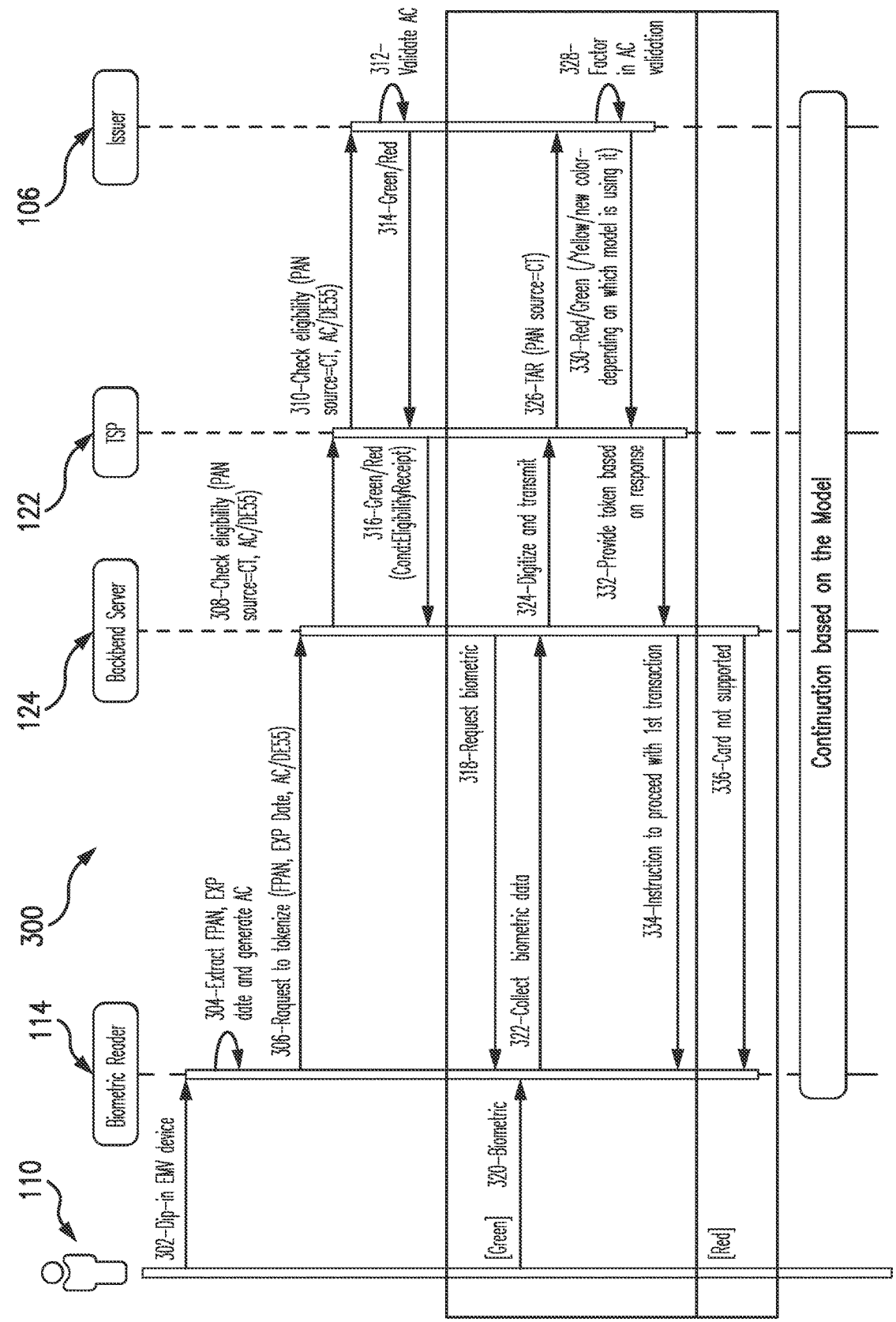
FIG. 3 is an example method, suitable for use with the system of FIG. 1, for provisioning a token for a payment account based on validation of an application cryptogram (AC) by an issuer associated with the payment account.

FIG. 3 illustrates an example method 300 of provisioning a token associated with an account (such that a user may initiate a transaction using a biometric associated with the token). The method 300 is described in connection with the example system 100 and the backend 124 included therein, and the example computing device 200. However, it should be appreciated that the method 300 is not limited to the system 100 or the computing device 200, but may be implemented in a variety of different systems and/or payment devices and/or computing devices. Likewise, the systems, the payment devices, and the computing devices described herein should not be understood to be limited to the example method 300, or other methods described herein.

That said, the method 300 describes provisioning of a token based on validation of an application cryptogram (AC) by the issuer 106 (e.g., where the AC may be generated through use of session keys assigned to the token, etc.).

At the outset, at 302, the user 110 dips or otherwise presents the EMV-enabled payment device 112 to the biometric reader 114 of the merchant 102 (which may be included, for example, as part of the terminal 108, or separate) in order to request provisioning a token to the user's biometric. At 304, the biometric reader 114 extracts payment account credentials from the payment device 112, including, without limitations, a funding primary account number (FPAN), an expiration date (EXP date) for the payment device 112, etc., and further generates an AC consistent with one or more specifications (e.g., for inclusion in DE 55 of a request, etc.), including a suitable EMV specification (see, e.g., www.emvco.com, which is incorporated herein by reference), etc.

Next, the biometric terminal 114 submits, at 306, a request to tokenize the extracted payment account credentials to the backend 124. The request includes the FPAN, the expiration date, the other account credentials, and the AC. The request may include further information, as needed or desired. The backend 124 checks, at 308, the eligibility of the payment account associated with the FPAN, for tokenization, with the token service provider 122. The eligibility check includes, for example, the FPAN and AC. The token service provider 122, in turn, checks, at 310, the eligibility of the payment account and/or payment device 112 with the issuer 106 (e.g., the chip card/device (CT), presence of the AC in DE 55 of the request, etc.). The check to the issuer 106 includes, again, the FPAN and the AC, but may include further information as needed, or desired.

The issuer 106 then validates, at 312, the AC. Based on the validation of the AC, the issuer 106 responds, at 314, to the token service provider 122, with either a green or red response, indicating pass or fail, respectively. The token service provider 122 then returns, at 316, the green or red response to the backend 124.

When the response is green, the backend 124 provides an instruction, at 318, to the biometric reader 114 (broadly, terminal 108) for the user 110 to present a biometric via the user 110 waving or otherwise presenting it to the biometric reader 114. The biometric reader 114, in turn, displays the instruction, whereupon, at 320, the user 110 presents the biometric to the biometric reader 114. The biometric reader 114 collects, at 322, the biometric data and submits the biometric data to the backend 124. The backend 124 processes, at 324, the biometric data, for example, by digitizing the biometric data and storing the digitized biometric data in memory (e.g., the memory 204, etc.) (for subsequent use in identifying the corresponding token for the user 110, etc.). The backend 124 also provides the digitized biometric data to the token service provider 122. The token service provider 122 submits, at 326, a tokenization request (TAR) to the issuer 106 (e.g., a request for use of the payment account in biometric transactions, etc.). The request includes the FPAN for the payment account. The issuer 106 then decides, at 328, whether to permit the payment account credential to be tokenized, based, at least in part, on the AC validation (e.g., at step 312, or a repeat of the validation, etc.). The issuer 106 then provides, at 330, a response, based on its determination regarding tokenization, including a red, yellow or green response (or other suitable indicator) to the token service provider 122 (as described in more detail below with regard to FIGS. 8-11).

At 332, the token service provider 122 provides a token to the backend 124, or not, along with the issuer's response, depending on the response from the issuer 106 (at step 330). Specifically, in this embodiment, a green response (at 330) permits the token service provider 122 to provision the token. In connection therewith, the backend 124 stores the provisioned token in connection with the FPAN, the expiration date, etc., of the payment account and payment device 112. Additionally, the backend 124 indicates, at 334, the token is provisioned and that the user 110 is allowed to initiate a transaction via a biometric based on the token. That said, as described more below, a red response from the issuer 106 (at 330) may preclude the transaction, and that a yellow response (at 330) may require additional authentication of the user 110. It should be understood that the transaction will include a retrieval of the token, by the terminal 108, from the backend 124, based on the biometric data captured by the biometric terminal 114 and provided to the backend 124 in a request for the token. The terminal 108 at the merchant 102, upon receipt of the token, is permitted to then initiate a payment account transaction as is conventional with the token.

Alternatively, a red response (not approved) from the issuer 106 (at step 314) precludes the token service provider 122 from provisioning the token (at step 316). Here, the backend 124 indicates, at 336, to the biometric reader 114, that the payment device 112 is not suitable and/or unsupported for tokenization as requested. The indication is in turn displayed to the user 110.

Figure 4:
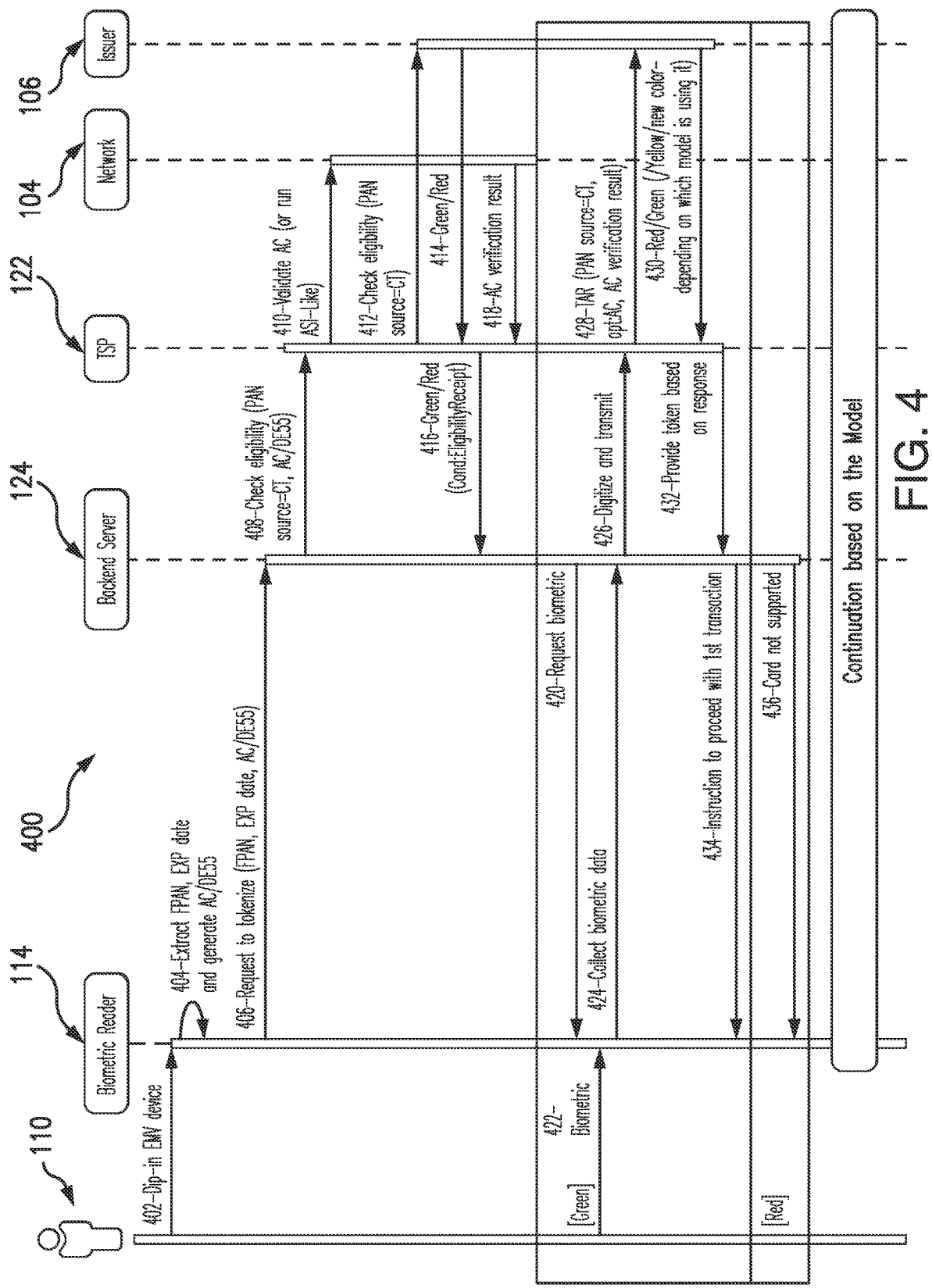
FIG. 4 is an example method, suitable for use with the system of FIG. 1, for provisioning a token for a payment account based on validation of an AC by a token service provider.

FIG. 4 illustrates another example method 400 of provisioning a token associated with an account (such that a user may initiate a transaction using a biometric associated with the token). The method 400 is described in connection with the example system 100 and the backend 124 included therein, and the example computing device 200. However, it should be appreciated that the method 400 is not limited to the system 100 or the computing device 200, but may be implemented in a variety of different systems and/or payment devices and/or computing devices. Likewise, the systems, the payment devices, and the computing devices described herein should not be understood to be limited to the example method 400, or other methods described herein.

The method 400 describes provisioning of a token based on validation of an AC by the token service provider 122.

At the outset, at 402, the user 110 dips or otherwise presents the EMV-enabled payment device 112 to the biometric reader 114 of the merchant 102 (which may be included, for example, as part of the terminal 108, or separate) in order to request provisioning a token to the user's biometric. At 404, the biometric reader 114 extracts payment account credentials from the payment device 112, including, without limitation, a FPAN, an expiration date for the payment device 112, etc., and further generates an AC for the transaction (as described above).

Next, at 406, the biometric terminal 114 submits a request to tokenize the extracted payment account credentials to the backend 124. The request includes the FPAN, the expiration date, the other account credentials, and the AC. The request may include further information, as needed or desired. The backend 124 checks, at 408, the eligibility of the payment account associated with the FPAN, for tokenization, with the token service provider 122. The eligibility check includes, for example, the FPAN and AC. The token service provider 122, in turn, validates, at 410, the AC with the payment network 104 (e.g., via an on-behalf-of service associated with the AC, etc.) (e.g., runs a chip-based authorization (ASI-Like), etc.). When validated, the token service provider 122 submits, at 412, an eligibility check for the payment account to the issuer 106.

The issuer 106 determines the eligibility of the payment account and then responds, at 414, to the token service provider 122, with either a red or green response (or other suitable indicator) indicating that the payment account is not eligible, or eligible, respectively.

The token service provider 122 then provides, at 416, the eligibility of the payment account to the backend 124. In connection with the above, the token service provider 122 also receives, at 418, a result of the AC validation from the payment network 104. It should be appreciated that the AC validation may be received at any time after the validation is requested (at 410) yet, generally, prior to step 428 below. In connection therewith, the backend 124 may not validate the AC, but may receive the outcome of the validation (e.g., for use in scoring, etc.).

When the response is green, the backend 124 provides an instruction, at 420, to the biometric reader 114 (broadly, the terminal 108) for the user 110 to present a biometric to the biometric reader 114. The biometric reader 114, in turn, displays the instruction, whereupon, at 422, the user 110 presents the biometric to the biometric reader 114, for example, by waving, etc. The biometric reader 114 collects, at 424, the biometric data and submits the biometric data to the backend 124. The backend 124 processes the biometric data, for example, by digitizing the biometric data and storing the digitized biometric data in memory (e.g., the memory 204, etc.). The backend 124 provides, at 426, the digitized biometric data to the token service provider 122. The token service provider 122 submits, at 428, a tokenization request (TAR) to the issuer 106 (e.g., a request for use of the payment account in biometric transactions, etc.). The request includes the FPAN for the payment account, and also the AC validation from the payment network 104 (as well as indications that the FPAN was obtained from the reader 114, and the AC option is implemented, etc.). The issuer 106 then decides whether to permit the payment account credential to be tokenized, based, at least in part, on the AC validation from the payment network 104. In turn, the issuer 106 provides, at 430, a response based on its determination regarding tokenization, including a red, yellow or green response (or other suitable indicator) to the token service provider 122.

At 432, the token service provider 122 provides a token to the backend 124, or not, depending on the response from the issuer 106. Specifically, in this embodiment, a green response (at 430) permits the token service provider 122 to provision the token. In connection therewith, the backend 124 stores the provisioned token in connection with the FPAN, the expiration date, etc., of the payment account and card. Additionally, the backend 124 indicates, at 434, that the token is provisioned and that the user 110 is allowed to initiate a transaction via a biometric based on the token.

Alternatively, a red response (not approved) from the issuer 106 (at step 414) precludes the token service provider 122 from provisioning the token (at step 416). Here, the backend 124 indicates, at 436, to the biometric reader 114, that the payment device 112 is not suitable and/or unsupported for tokenization as requested. The indication is in turn displayed to the user 110.

Figure 5:
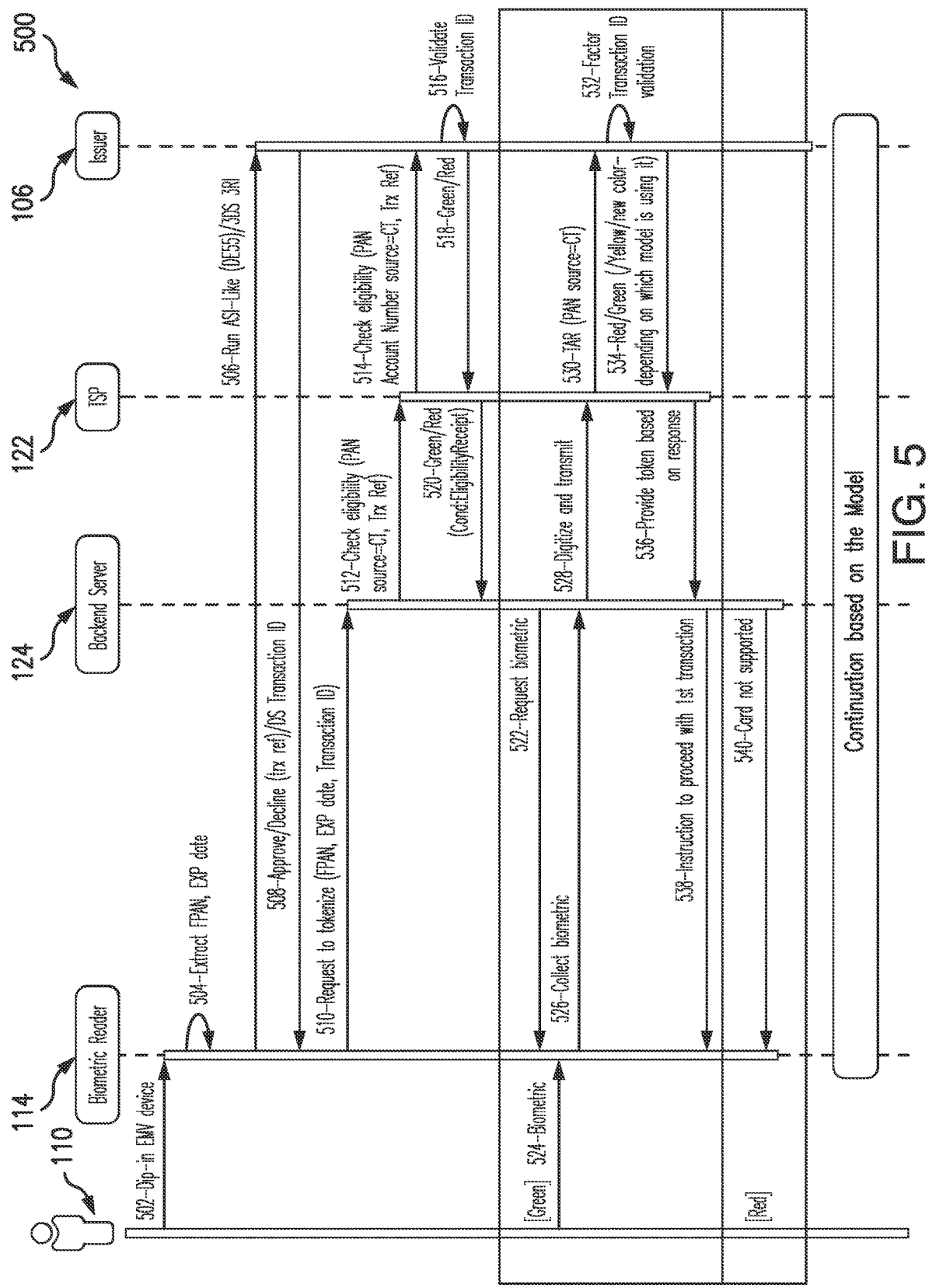
FIG. 5 is an example method, suitable for use with the system of FIG. 1, for provisioning a token for a payment account based on transaction identifier validation by an issuer associated with the payment account.

FIG. 5 illustrates another example method 500 of provisioning a token associated with an account (such that a user may initiate a transaction using a biometric associated with the token). The method 500 is described in connection with the example system 100 and the backend 124 included therein, and the example computing device 200. However, it should be appreciated that the method 500 is not limited to the system 100 or the computing device 200, but may be implemented in a variety of different systems and/or payment devices and/or computing devices. Likewise, the systems, the payment devices, and the computing devices described herein should not be understood to be limited to the example method 500, or other methods described herein.

The method 500 describes provisioning a token based on transaction identifier validation by the issuer 106.

At the outset, at 502, the user 110 dips or otherwise presents the EMV-enabled payment device 112 to the biometric reader 114 of the merchant 102 (which is part of the terminal 108, or separate) in order to request provisioning of a token to the user's biometric. At 504, the biometric reader 114 (or terminal 108) extracts payment account credentials from the payment device 112, including, without limitation, a FPAN, an expiration date for the payment device 112, etc., and initiates, at 506, a transaction to the payment account associated with the payment device 112 (e.g., for a nominal amount (e.g., $0.25, etc.), etc.) (e.g., runs a chip-based authorization (ASI-Like) using DE 55 and all chip data, but with zero or low dollar value in order to see if the device is valid or not and the user has a valid account; etc.) (e.g., consistent with the 3DS protocol, with the 3DS requestor initiated (3RI) protocol, etc.). It should be appreciated that the transaction may be initiated to a specific merchant identifier (MID), which is identified or specific to token provisioning. The MID is then included in the messaging associated with the transaction, and available to the issuer 106.

In response, the issuer 106 returns an approval or a decline of the transaction, at 508, which is associated with a transaction identifier or ID for the transaction (broadly, a transaction reference). The transaction ID is generated in connection with messaging associated with the payment network 104 (e.g., associated with the directory server (DS) 118, etc.) (e.g., a network transaction reference number, etc.). The issuer 106 may further recognize the transaction as associated with a token provisioning request, as indicated by the MID, and store the transaction ID in memory (e.g., in memory 204, etc.) in association therewith, etc.

The biometric reader 114 (broadly, terminal 108) then submits, at 510, a request to tokenize the payment account to the backend 124. The request includes the FPAN, expiration date from the payment device 112, and also the transaction ID. The backend 124 checks, at 512, the eligibility of the payment account associated with the FPAN with the token service provider 122. The eligibility check includes the FPAN and the transaction ID, but may further include other information. The token service provider 122, in turn, checks, at 514, the eligibility of the payment account with the issuer 106. The check to the issuer 106 includes, again, the FPAN and the transaction ID, but may include further information as needed, or desired.

The issuer 106 then validates, at 516, the transaction ID based on the prior approval or decline of the transaction initiated at 506 (e.g., by matching the transaction ID in the check to the transaction ID in memory, etc.). Based on the validation of the transaction ID, the issuer 106 responds, at 518, to the token service provider 122 with either a green (approved) or red (not approved) response (or indicator) indicating pass or fail, respectively. At 520, the token service provider 122 then returns, the green or red response to the backend 124.

When the response is green, the backend 124 provides an instruction, at 522, to the biometric reader 114 (broadly, the terminal 108) for the user 110 to present a biometric to the biometric reader 114. The biometric reader 114, in turn, displays the instruction, whereupon, at 524, the user 110 presents the biometric to the biometric reader 114. The biometric reader 114 collects, at 526, the biometric data and submits the biometric data to the backend 124. Upon receipt, in this example, the backend 124 processes the biometric data, for example, by digitizing the biometric data and storing the digitized biometric data in memory (e.g., the memory 204, etc.). The backend 124 provides, at 528, the digitized biometric data to the token service provider 122. The token service provider 122 submits, at 530, a tokenization request (TAR) back to the issuer 106 (e.g., a request for use of the payment account in biometric transactions, etc.). The request includes the FPAN for the payment account. The issuer 106 then decides whether to permit the payment account credential to be tokenized, based, at least in part, on the transaction ID validation (e.g., at step 516, or a repeat of the validation, etc.). The issuer 106 then provides, at 534, a response including a red, yellow or green indicator (or other suitable indicator) to the token service provider 122.

The token service provider 122 provides, at 536, a token to the backend 124, or not, along with the response, depending on the response from the issuer 106. Specifically, in this embodiment, a green response (from step 534) permits the token service provider 122 to provision the token. And, in connection therewith, the backend 124 stores the provisioned token in connection the FPAN, expiration date, etc., of the payment account, and further indicates, at 538, that the token is provisioned and that the user 110 is allowed to initiate a transaction via a biometric.

Alternatively, the red response from the issuer 106 (at step 518) precludes the token service provider 122 from provisioning the token (at step 520). Here, the backend 124 indicates, at 540, to the biometric reader 114, that the payment device 112 is not suitable and/or unsupported for tokenization as requested. The indication is in turn displayed to the user 110.

Figure 6:
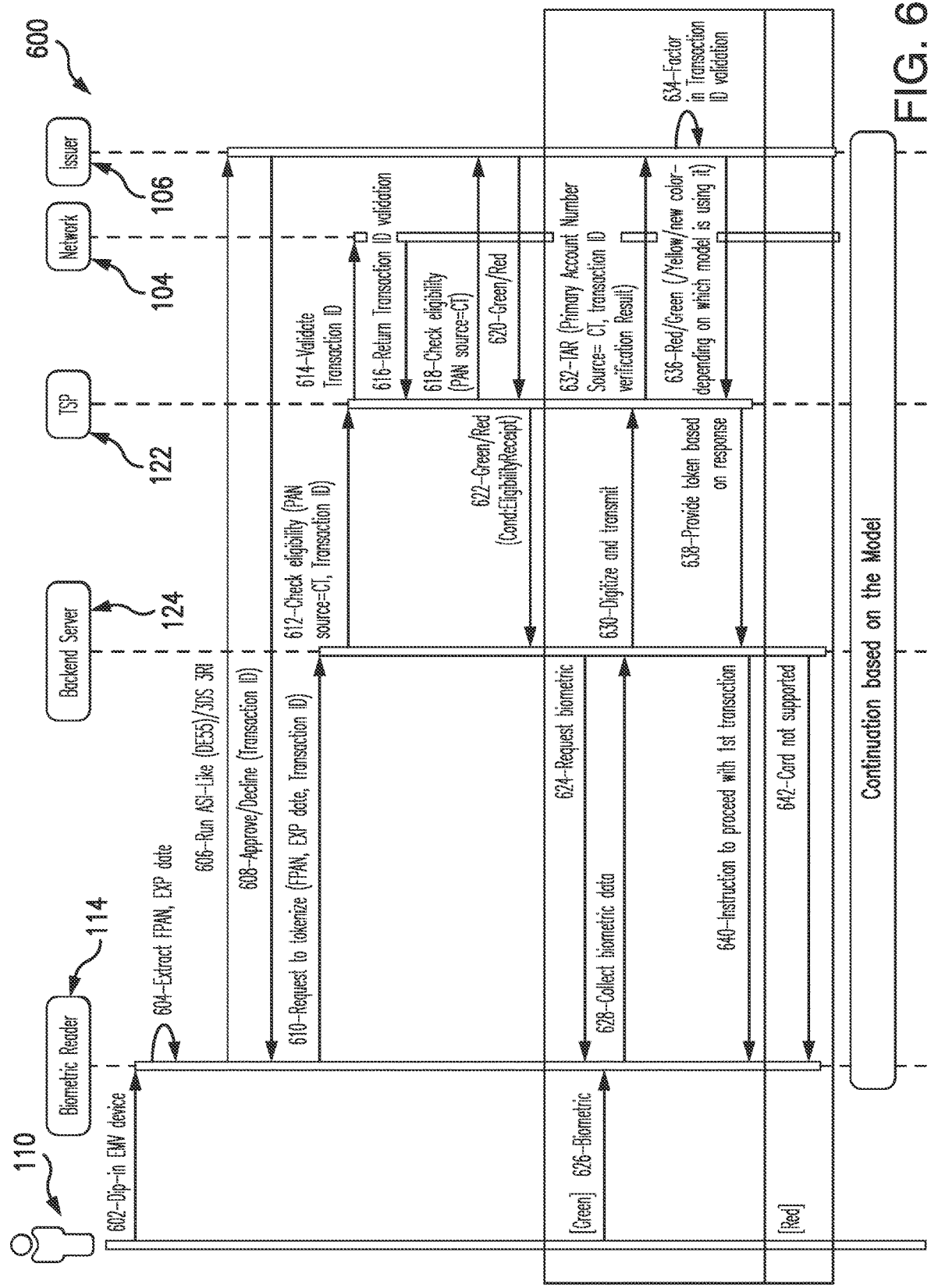
FIG. 6 is an example method, suitable for use with the system of FIG. 1, for provisioning a token for a payment account based on transaction identifier validation by a token service provider.

FIG. 6 illustrates another example method 600 of provisioning a token associated with an account (such that a user may initiate a transaction using a biometric associated with the token). The method 600 is described in connection with the example system 100 and the backend 124 included therein, and the example computing device 200. However, it should be appreciated that the method 600 is not limited to the system 100 or the computing device 200, but may be implemented in a variety of different systems and/or payment devices and/or computing devices. Likewise, the systems, the payment devices, and the computing devices described herein should not be understood to be limited to the example method 600, or other methods described herein.

The method 600 describes provisioning a token based on transaction identifier validation by the token service provider 122.

At the outset, at 602, the user 110 dips or otherwise presents the EMV-enabled payment device 112 to the biometric reader 114 of the merchant 102 (which is part of the terminal 108, or separate) in order to request provisioning of a token to the user's biometric. At 604, the biometric reader 114 (or terminal 108) extracts payment account credentials from the payment device 112, including, without limitation, a FPAN, an expiration date for the payment device 112, etc., and initiates, at 606, a transaction to the payment account associated with the payment device 112 (e.g., for a nominal amount (e.g., $0.25, etc.), etc.) (e.g., runs a chip-based authorization (ASI-Like) using DE 55 and all chip data, but with zero or low dollar value in order to see if the device is valid or not and the user has a valid account; etc.) (e.g., consistent with the 3DS protocol, etc.). It should be appreciated that the transaction may be initiated to a specific merchant identifier (MID), which is identified or specific to token provisioning. The MID is then included in the messaging associated with the transaction, and available to the issuer 106.

In response, the issuer 106 returns an approval or a decline of the transaction, at 608, which is associated with a transaction identifier or ID for the transaction. The transaction ID is generated in connection with messaging associated with the payment network 104 (e.g., a network transaction reference number, etc.). The issuer 106 may, optionally, further recognize the transaction as associated with a token provisioning request, as indicated by the particular MID associated with the messaging, and store the transaction ID in memory (e.g., in memory 204, etc.).

The biometric reader 114 (broadly, the terminal 108) submits, at 610, a request to tokenize the payment account to the backend 124. The request includes the FPAN, the expiration date from the payment device 112, and also the transaction ID. The backend 124 checks, at 612, the eligibility of the payment account associated with the FPAN with the token service provider 122. The eligibility check includes the FPAN and the transaction ID, but may further include other information. The token service provider 122, in turn, validates, at 614, the transaction ID with the payment network 104 (e.g., via an on-behalf-of service, etc.). When validated by the payment network 104, a transaction ID validation is returned to the token service provider 122, at 616. It should be appreciated that the transaction ID validation may be received at any time after eligibility of the payment account is determined with the issuer 106 (yet, generally, prior to step 640 below).

Then, in response to the validation, or independent thereof, the token service provider 122 submits, at 618, an eligibility check for the payment account to the issuer 106. The eligibility check includes the FPAN for the payment account, but may include other information as desired or required. The issuer 106 determines the eligibility of the payment account and responds, at 620, to the token service provider 122 with a response including either a red (approved) or green (not approved) indicator (or other suitable indicator) indicating that the payment account is not eligible, or eligible, respectively.

The token service provider 122 then provides, at 622, the eligibility of the payment account to the backend 124 (e.g., the red or green indicator, etc.).

When the response is green, the backend 124 provides an instruction, at 624, to the biometric reader 114 for the user 110 to present a biometric to the biometric reader 114. The biometric reader 114, in turn, displays the instruction, whereupon, at 626, the user 110 presents the biometric to the biometric reader 114. The biometric reader 114 collects, at 628, the biometric data and submits the biometric data to the backend 124. The backend 124 processes the biometric data, for example, by digitizing the biometric data and storing the digitized biometric data in memory (e.g., the memory 204, etc.). The backend 124 provides, at 630, the digitized biometric data to the token service provider 122. The token service provider 122 submits, at 632, a tokenization request (TAR) to the issuer 106 (e.g., a request for use of the payment account in biometric transactions, etc.). The request includes the FPAN for the payment account, and also the transaction ID validation from the payment network 104. The issuer 106 then decides, at 634, whether to permit the payment account credential to be tokenized, based, at least in part, on the transaction ID validation from the payment network 104 (and/or further validation with a transaction ID included in memory of the issuer 106, etc.). The issuer 106 then provides, at 636, a response including a further red, yellow or green indicator (or other suitable indicator) to the token service provider 122.

Then, at 638, the token service provider 122 provides a token to the backend 124, or not, depending on the response from the issuer 106 (e.g., depending on the red, yellow, or green indicator at step 636, etc.). When the token is issued (e.g., a green response at step 636, etc.), the backend 124 stores the token in connection the FPAN, expiration date, etc., of the payment account, and further indicates, at 640, that the token is provisioned and that the user 110 is allowed to initiate a transaction via a biometric. Thereafter, the user 110 is permitted to initiate a transaction at the biometric terminal 114 associated with the merchant 102, or other biometric terminal associated with another merchant, by waving the user's hand (or broadly, presenting the same biometric) at the biometric reader.

Alternatively, when the response from the issuer 106 is red (from step 620), the backend 124 indicates, at 642, to the biometric reader 114, that the payment device 112 is not suitable and/or unsupported for tokenization as requested. The indication is in turn displayed to the user 110.

Figure 7:
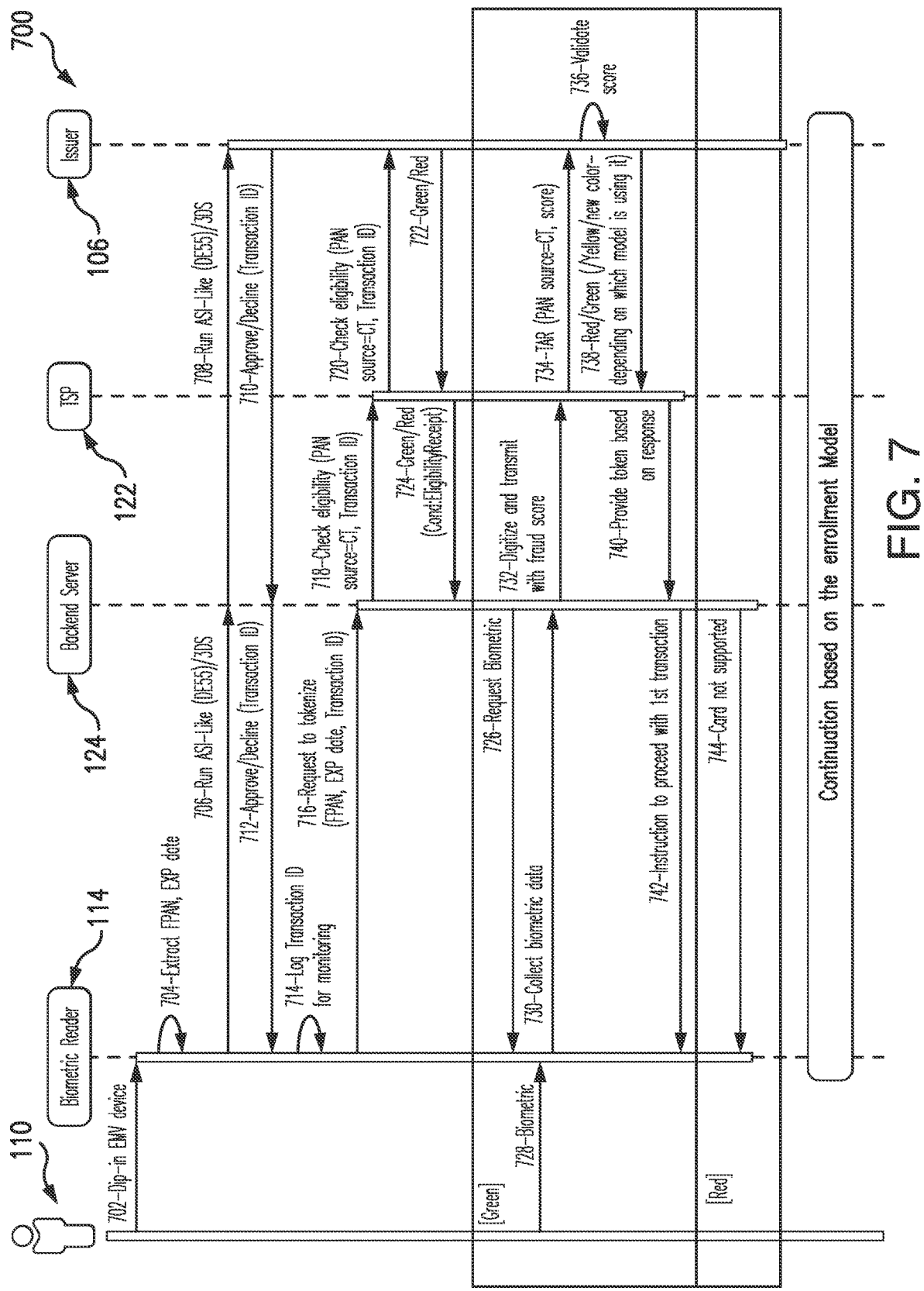
FIG. 7 is an example method, suitable for use with the system of FIG. 1, for provisioning a token for a payment account based on score validation by an issuer associated with the payment account.

FIG. 7 illustrates another example method 700 of provisioning a token associated with an account (such that a user may initiate a transaction using a biometric associated with the token). The method 700 is described in connection with the example system 100 and the backend 124 included therein, and the example computing device 200. However, it should be appreciated that the method 700 is not limited to the system 100 or the computing device 200, but may be implemented in a variety of different systems and/or payment devices and/or computing devices. Likewise, the systems, the payment devices, and the computing devices described herein should not be understood to be limited to the example method 700, or other methods described herein.

The method 700 describes provisioning a token based on score validation by the issuer 106.

At the outset, at 702, the user 110 dips or otherwise presents the EMV-enabled payment device 112 to the biometric reader 114 of the merchant 102 (which is part of the terminal 108, or separate) in order to request provisioning of a token to the user's biometric. At 704, the biometric reader 114 (or terminal 108) extracts payment account credentials from the payment device 112, including, without limitation, a FPAN, an expiration date for the payment device 112, etc., and initiates, at 706, a transaction to the payment account associated with the payment device 112 (e.g., for a nominal amount (e.g., $0.25, etc.), etc.), via the backend 124 (e.g., runs a chip-based authorization (ASI-Like) using DE 55 and all chip data, but with zero or low dollar value in order to see if the device is valid or not and the user has a valid account; etc.) (e.g., consistent with the 3DS protocol, with the 3DS requestor initiated (3RI) protocol, etc.). It should be appreciated that the transaction may be initiated to a specific MID, which is identified or specific to token provisioning. The MID is then included in the messaging associated with the transaction, and available to the backend 124 and/or the issuer 106.

In turn, the backend 124 pushes, at 708, the transaction to the issuer 106. In response, the issuer 106 returns an approval or a decline of the transaction, at 710, which is associated with a transaction ID for the transaction. The transaction ID is generated in connection with messaging associated with the payment network 104 (e.g., a network transaction reference number, etc.). The backend 124, in turn, pushes, at 712, the response from the issuer 106 back to the biometric reader 114 (or the terminal 108).

The biometric reader 114 (broadly, the terminal 108) logs, at 714, the transaction ID for monitoring (e.g., stores the transaction ID in memory (e.g., the memory 204, etc.), etc. for availability upon request by the issuer 106) and further submits, at 716, a request to tokenize the payment account to the backend 124. The request includes the FPAN, expiration date from the payment device 112, and also the transaction ID. The backend 124 checks, at 718, the eligibility of the payment account associated with the FPAN with the token service provider 122. The eligibility check includes the FPAN and the transaction ID, but may further include other information. And, the token service provider 122 submits, at 720, an eligibility check for the payment account to the issuer 106. The eligibility check includes the FPAN for the payment account, but may also include other information as desired or required. The issuer 106 determines the eligibility of the payment account and responds, at 722, to the token service provider 122 with a response including either a red or green indicator (or other suitable indicator) indicating that the payment account is not eligible or eligible, respectively.

The token service provider 122 then provides, at 724, the eligibility of the payment account to the backend 124 (e.g., the red or green indicator, etc.).

When the response is green, the backend 124 provides an instruction, at 726, to the biometric terminal 114 for the user 110 to present a biometric to the biometric reader 114. The biometric reader 114, in turn, displays the instruction, whereupon, at 728, the user 110 presents the biometric to the biometric reader 114. The biometric reader 114 collects, at 730, the biometric data and submits the biometric data to the backend 124. The backend 124 processes the biometric data, for example, by digitizing the biometric data and storing the digitized biometric data in memory (e.g., the memory 204, etc.). The backend 124 provides, at 732, the digitized biometric data to the token service provider 122. In addition, in this embodiment, the backend 124 includes a fraud score, for the transaction, with the biometric data. The fraud score is generated by the backend 124 to indicate to the issuer 106 a level of confidence about the tokenization request.

The token service provider 122 submits, at 734, a tokenization request (TAR) to the issuer 106 (e.g., a request for use of the payment account in biometric transactions, etc.). The request includes the FPAN for the payment account, and also the score for the transaction. The issuer 106 then decides, at 736, whether to permit the payment account credential to be tokenized, based, at least in part, on the score included in the request. For example, where the score is a 5, the issuer 106 may determine a green response, while the issuer 106 may determine a yellow response for a score of 4 (e.g., indicating validation is not applicable, etc.). Still further, the issuer may determine a red response for a score of 1, 2 or 3, which indicate a failed validation. It should be appreciated that the scoring, and the thresholds for response, and the indications thereof, may vary in other method embodiments. Regardless, the issuer 106 then provides, at 738, a response including a red, yellow or green indicator (or other suitable indicator) to the token service provider 122.

In turn, the token service provider 122 provides, at 740, a token back to the backend 124, or not, depending on the response from the issuer 106. Specifically, a green response from the issuer 106 (at step 738) permits the token service provider 122 to provision the token. In addition, the backend 124 also stores the token in connection the FPAN, expiration date, etc., of the payment account, and further indicates, at 742, that the token is provisioned and that the user 110 is allowed to initiate a transaction via a biometric. Thereafter, the user 110 is permitted to initiate a transaction at the biometric terminal 114 associated with the merchant 102, or other biometric terminal associated with another merchant, by waving the user's hand (or broadly, presenting the same biometric) at the biometric reader.

Alternatively, when the response from the issuer 106 is red (from step 722), the backend 124 indicates, at 744, to the biometric reader 114, that the payment device 112 is not suitable and/or is unsupported for tokenization as requested. The indication is in turn displayed to the user 110.

Figure 8:
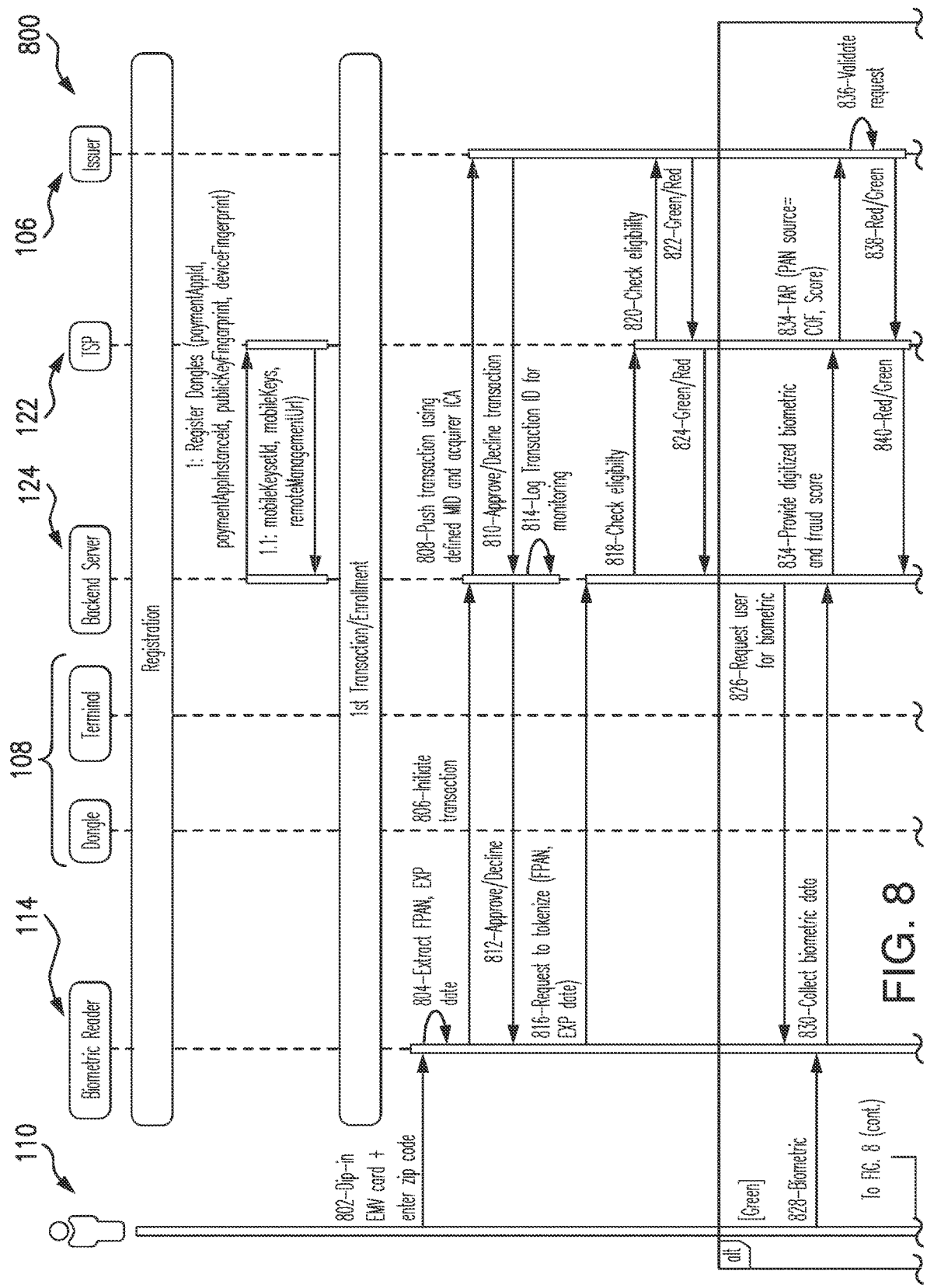
FIG. 8 is an example method, suitable for use with the system of FIG. 1, for provisioning a token for a payment account.
Figure 8:
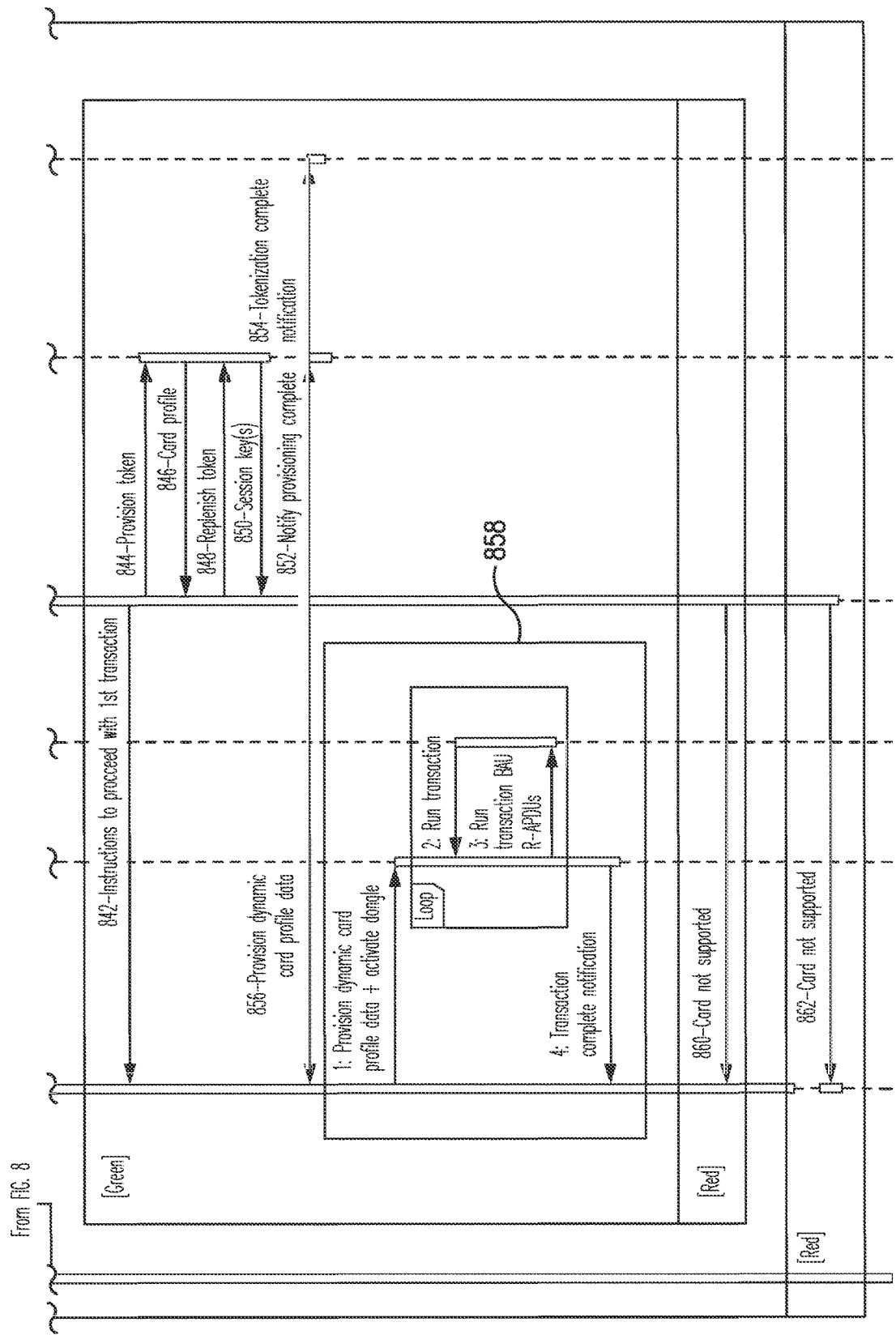

FIG. 8 illustrates another example method 800 of provisioning a token associated with an account (such that a user may initiate a transaction using a biometric associated with the token). The method 800 is described in connection with the example system 100 and the backend 124 included therein, and the example computing device 200. However, it should be appreciated that the method 800 is not limited to the system 100 or the computing device 200, but may be implemented in a variety of different systems and/or payment devices and/or computing devices. Likewise, the systems, the payment devices, and the computing devices described herein should not be understood to be limited to the example method 800, or other methods described herein.

The method 800 describes provisioning of a token based on a validation by the issuer 106 and an MID look-up. It should be appreciated that, in the method 800, registration is complete between the backend 124 and the token service provider 122 (as indicated at steps 1 and 1.1 in method 800), whereby the biometric reader 114 (and terminal 108) (including a dongle associated with the terminal 108) are registered as devices associated with provisioning tokens for biometric identity transactions (e.g., via an exchange of keys (or sets of keys), and identifiers, etc.).

At the outset, at 802, the user 110 dips or otherwise presents the EMV-enabled payment device 112 to the biometric reader 114 of the merchant 102 (which is part of the terminal 108, or separate) in order to request provisioning a token to the user's biometric. In doing so, the user 110 may also be solicited to enter his/her zip code, etc. At 804, the biometric reader 114 (or terminal 108) extracts payment account credentials from the payment device 112, including, without limitation, a FPAN, an expiration date for the payment device 112, etc., and initiates, at 806, a transaction to the payment account associated with the payment device 112 (e.g., for a nominal amount (e.g., $0.25, etc.), etc.), via the backend 124. With that said, the transaction in this embodiment is initiated with a MID, which is identified or specific to token provisioning and which is unique to the acquirer. The MID is then included in the messaging associated with the transaction, and available to the backend 124 and/or the issuer 106. The request further includes a specific acquirer interbank card association (ICA) to enable identification of the acquirer (and, thus, interpretation of the MID which is unique to the identified acquirer).

At 808, the backend 124 pushes the transaction to the issuer 106. The backend 124 may include an address verification service (AVS), for example, and provide a zip code validation in the communication. In response, the issuer 106 returns an approval or a decline of the transaction, at 810, which is associated with a transaction ID. The transaction ID is generated in connection with messaging associated with the payment network 104 (e.g., a network transaction reference number, etc.). The backend 124, in turn, pushes, at 812, the response from the issuer 106 back to the biometric reader 114 (or the terminal 108). In addition, the backend 124 stores, at 814, the transaction ID in memory, and further monitors messaging to/from the backend 124 for the transaction ID.

The biometric reader 114 (broadly, the terminal 108) then submits, at 816, a request to tokenize the payment account to the backend 124. The request includes the FPAN, the expiration date from the payment device 112, and also the transaction ID. The backend 124 checks, at 818, the eligibility of the payment account associated with the FPAN, with the token service provider 122. The eligibility check includes the FPAN and the transaction ID, but may further include other information (e.g., a card-on-file (COF) indication, etc.). And, the token service provider 122 submits, at 820, an eligibility check for the payment account to the issuer 106. The eligibility check includes the FPAN for the payment account, but may include other information as desired or required. The issuer 106 determines the eligibility of the payment account and responds, at 822, to the token service provider 122 with a response including either a red (not approved) or green (approved) indicator (or other suitable indicator) indicating that the payment account is not eligible or eligible, respectively.

The token service provider 122 then provides, at 824, the eligibility of the payment account to the backend 124 (e.g., the red or green indicator, etc.).

When the response is green (at step 822), the backend 124 provides an instruction, at 826, to the biometric reader 114 for the user 110 to present a biometric to the biometric reader 114. The biometric reader 114, in turn, displays the instruction, whereupon, at 828, the user 110 presents the biometric to the biometric reader 114. The biometric reader 114 collects, at 830, the biometric data and submits the biometric data to the backend 124. The backend 124 processes the biometric data, for example, by digitizing the biometric data and storing the digitized biometric data in memory (e.g., the memory 204, etc.). The backend 124 provides, at 832, the digitized biometric data to the token service provider 122. In addition, the backend 124 includes a score, for the transaction, with the biometric data. The score is generated by the backend 124 to indicate to the issuer 106 a level of confidence about the tokenization request.

In turn, the token service provider 122 submits, at 834, a tokenization request (TAR) to the issuer 106 (e.g., a request for use of the payment account in biometric transactions, etc.). The request includes the FPAN, the transaction ID, and the score. The issuer 106 then validates, at 836, the request based on the transaction ID being associated with a transaction ID having the MID, and the score. When validated, the issuer 106 decides to permit the payment account credential to be tokenized. The issuer 106 then provides, at 838, a response including another red or green indicator (or potentially a yellow or another color indicator) to the token service provider 122.

The token service provider 122 provides, at 840, the response (and indicator) to the backend 124.

When the response from the issuer 106 (at step 838) is green, the backend 124 then provides an instruction, at 842, for the user 110 to proceed in transactions (or at least a first transaction). In addition, the backend 124 instructs, at 844, the token service provider 122 to provision the token. The token service provider 122, in turn, provisions the token and the token profile, at 846, to the backend 124. The backend 124 then replenishes the token, at 848, and the token service provider 122 responds with one or more sets of session keys for the token, at 850. The backend 124 then stores the token and session key(s) in association with the biometric data for the user 110, and notifies, at 852, the token service provider 122 that the provisioning is complete. And, the token service provider 122 notifies, at 854, the issuer 106 of the token being provisioned for a biometric identification transaction.

Next, the backend 124 (in response to a purchase request) provides, at 856, the token, or more broadly, the profile data, to the biometric reader 114. As noted above, the biometric reader 114 may be included in the terminal 108, or not. In this embodiment, then, the terminal 108 is associated with a dongle, which provides for communication between the biometric reader 114 and the terminal 108. And, a payment account transaction is then provided, at 858, through the illustrated interactions in FIG. 8.

Conversely, when the response from the issuer 106 is red, from steps 838 and 840, the backend 124 indicates, at 860, that the payment device 112 does not support biometric provisioning. Likewise, at 862, when the response from the issuer 106 is red, from steps 822 and 824, the backend 124 indicates that the payment device 112 does not support biometric provisioning, based on the response being red at step 824.

Figure 9:
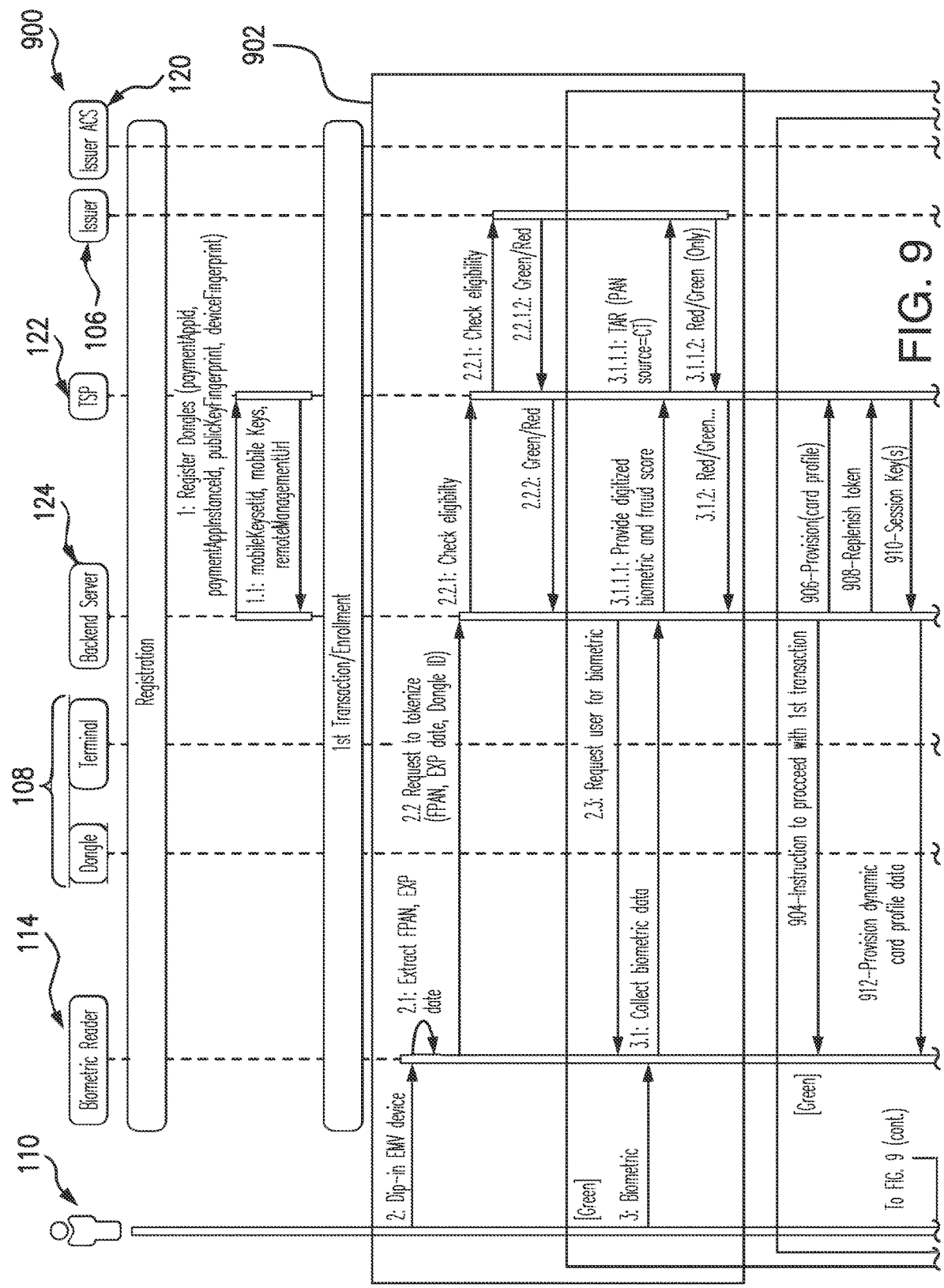
FIG. 9 is an example method, suitable for use with the system of FIG. 1, for limiting provisioned token usage, in connection with identification and verification of a user.
Figure 9:
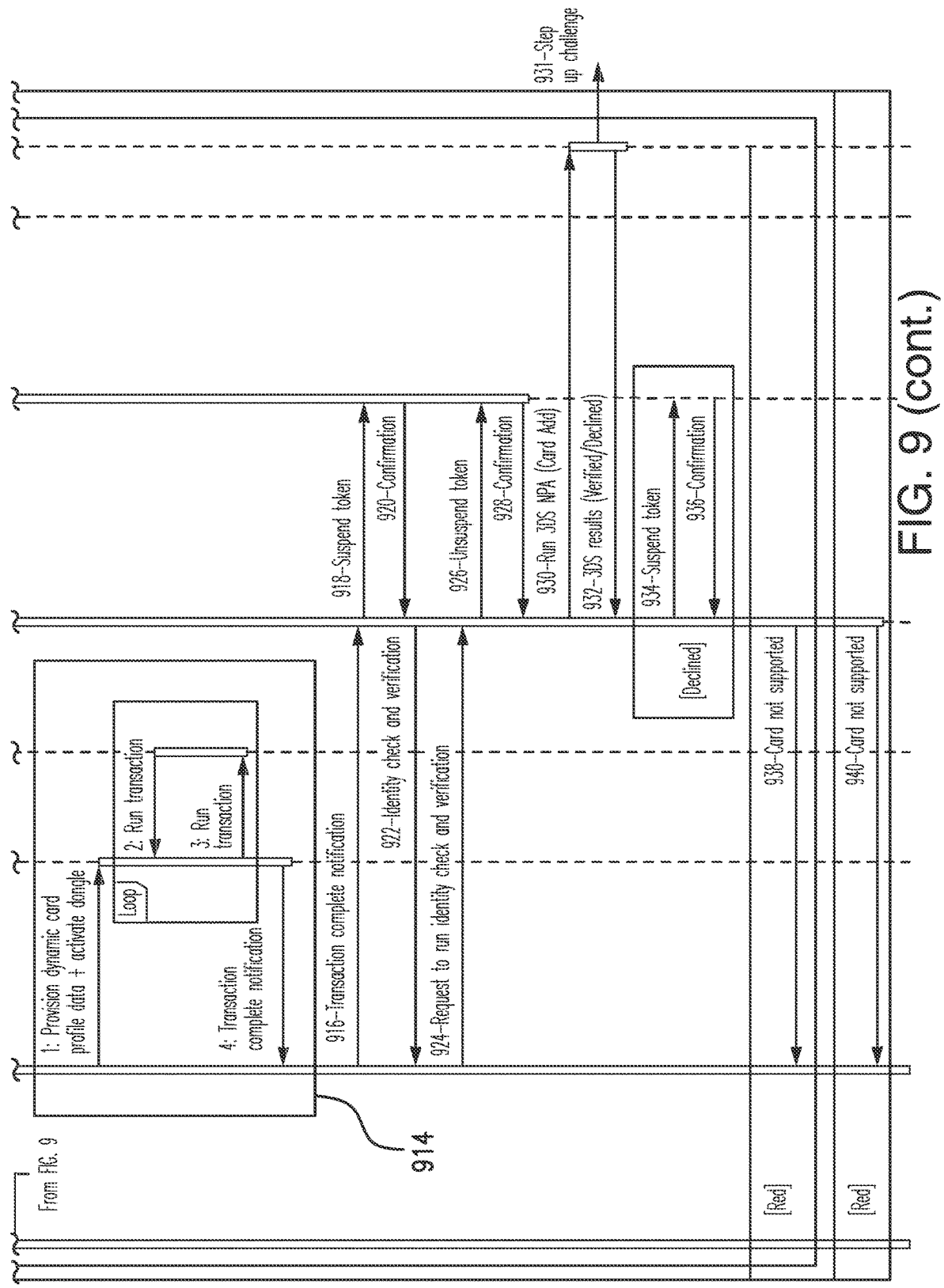

FIG. 9 illustrates another example method 900 relating to provisioning of a token associated with an account. The method 900 is described in connection with the example system 100 and the backend 124 included therein, and the example computing device 200. However, it should be appreciated that the method 900 is not limited to the system 100 or the computing device 200, but may be implemented in a variety of different systems and/or payment devices and/or computing devices. Likewise, the systems, the payment devices, and the computing devices described herein should not be understood to be limited to the example method 900, or other methods described herein.

In particular, the method 900 relates to a suspension of the token, by the backend 124, as a manner of controlling the token. It should be appreciated that, in the method 900, registration is completed between the backend 124 and the token service provider 122 (as indicated at steps 1 and 1.1 in method 900), whereby the biometric reader 114 of the merchant 102 (and the terminal 108) (including a dongle associated with the terminal 108) are registered as devices associated with provisioning tokens for biometric identity transactions (e.g., via the exchange of keys, and identifiers, etc.).

That said, at 902 (as represented by steps 2 through 3.1.1.2 in FIG. 9), an eligibility check for the payment device 112 is performed consistent with, for example, the initial steps of the method 800 (of FIG. 8), but based, at least in part, on an application instance ID, etc., whereby the issuer 106, and then the token service provider 122, provides a response including a red or green indicator, indicating that the user's account is eligible or ineligible, respectively.

In connection therewith, in the method 900, when the response form the issuer 106 is green, the backend 124 provides an instruction, at 904, for the user 110 to proceed in transactions (or at least a first transaction). In addition, the backend 124 instructs, at 906, the token service provider 122 to provision a token. The token service provider 122, in turn, provisions the token and the token profile to the backend 124. The backend 124 then replenishes the token, at 908, and the token service provider 122 responds with one or more sets of session keys for the token, at 910. The backend 124 then stores the token and session key(s) in association with the biometric data for the user 110.

Next, the backend 124 (in response to the purchase request) provides, at 912, the token, or more broadly, the profile data, to the biometric reader 114. As noted above, the biometric reader 114 may be included in the terminal 108, or not. In the method 900, the terminal 108 is associated with a dongle, which provides for communication between the biometric reader 114 and the terminal 108. The payment account transaction is provided, at 914, then, through the illustrated interactions in FIG. 9 (at steps 1-4). And, at 916, the biometric reader 114 provides a transaction complete notification to the backend 124.

In response, the backend 124 suspends the token (provisioned above), at 918, thereby suspending the token after the one transaction. The backend 124 further confirms, at 920, suspension of the token to the token service provider 122. The backend 124 then notifies, at 922, the user 110 (via the reader 114) that the user 110 is required to complete an identity check and verification prior to any further transactions with the token (e.g., via a request for the identity check and verification with a URL associated with the dongle, the terminal 108, etc.). The user 110, in turn, requests to perform the identity check and verification, at 924. It should be appreciated that the request may be immediately after receipt by the user 110, or at some later time.

When the request is received, the backend 124 un-suspends the token, at 926, and the token service provider 122 confirms the token being un-suspended, at 928.

The backend 124 then performs a non-payment interaction (NPA) with the user 110, via the enhanced authentication associated with the payment device 112, at 930, which provides, in turn, an authentication request to the ACS 120. The ACS performs, at 931, a step-up challenge of the user 110 (consistent with 3DS). The step-up challenge may include a challenge question to the user 110 at a communication device associated with the user 110 (e.g., a smartphone, etc.). When the user 110 responds, or not, the ACS 120 verifies or declines the authentication, at 932, back to the backend 124. If the authentication is verified, the token remains un-suspended, and usable in subsequent biometric transactions. Conversely, if authentication is declined, the backend 124 suspends, at 934, the token with the token service provider 122, and at 936, the token service provider confirms the suspension of the token.

Conversely in the method 900, when the response(s) from the issuer 106 is(are) red, from step 902, the backend 124 indicates, at 938 or 940, that the payment device 112 does not support biometric provisioning (as generally described in the method 900, etc.).

Figure 10:
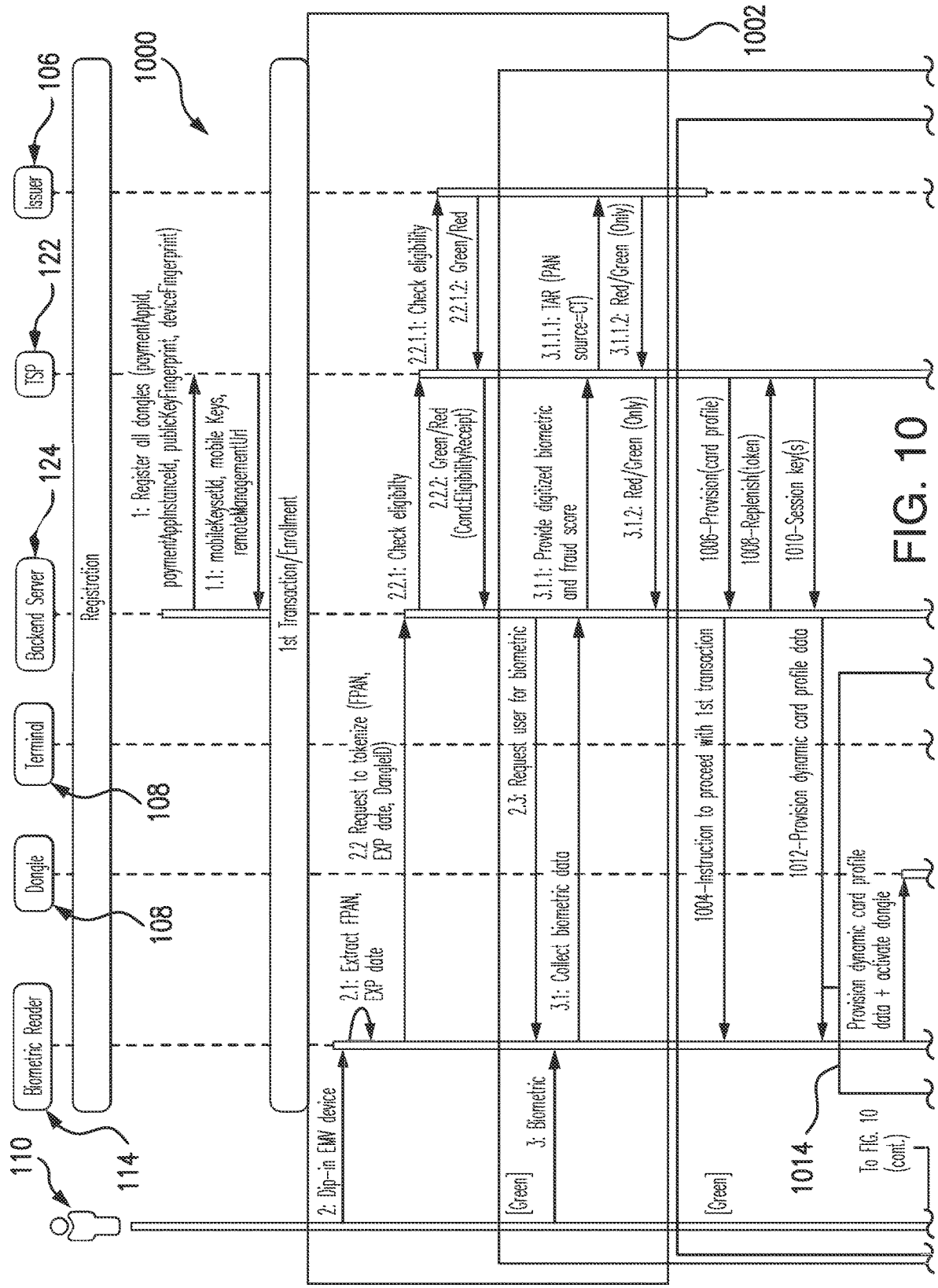
FIG. 10 is another example method, suitable for use with the system of FIG. 1, for limiting provisioned token usage, in connection with identification and verification of a user.

FIG. 10 illustrates another example method 1000 relating to provisioning of a token associated with an account. The method 1000 is described in connection with the example system 100 and the backend 124 included therein, and the example computing device 200. However, it should be appreciated that the method 1000 is not limited to the system 100 or the computing device 200, but may be implemented in a variety of different systems and/or payment devices and/or computing devices. Likewise, the systems, the payment devices, and the computing devices described herein should not be understood to be limited to the example method 1000, or other methods described herein.

More specifically, the method 1000 relates to a suspension of a token, by the issuer 106, as a manner of controlling the token when provisioned as described herein (and otherwise). It should be appreciated that in the method 1000, initially, registration is performed between the backend 124 and the token service provider 122 (as indicated at steps 1 and 1.1 in method 1000), whereby the biometric reader 114 of the merchant 102 (and terminal 108 (e.g., including the dongle, etc.)) are registered as device(s) associated with provisioning tokens for biometric identity transactions (e.g., via the exchange of keys, identifiers, etc.).

At 1002 (as represented by steps 2 through 3.1.1.2 in FIG. 10), an eligibility check for the payment device 112 is performed consistent with, for example, the initial steps of the method 800, but based, at least in part, on an application instance ID, etc., whereby the issuer 106, and then the token service provider 122, provides a response including a red or green indicator (or other suitable indicator) indicating that the payment device 112 is ineligible or eligible, respectively.

When the response from the issuer 106 with regard thereto is green, the backend 124 provides an instruction, at 1004, for the user 110 to proceed in transactions (or at least a first transaction). In addition, the backend 124 instructs the token service provider 122 to provision a token. The token service provider 122, in turn, provisions the token and the token profile, at 1006, to the backend 124. The backend 124 then replenishes the token, at 1008, and the token service provider 122 responds with one or more sets of session keys for the token, at 1010. The backend 124 then stores the token and session key(s) in association with the biometric data for the user 110.

Next, the backend 124 (in response to the purchase request) provides, at 1012, the token, or more broadly, the profile data, to the biometric reader 114 for use in the transaction. As noted above, the biometric reader 114 may be included in the terminal 108, or not. In the method 1000, again, the terminal 108 is associated with a dongle, which provides for communication between the biometric reader 114 and the terminal 108. The payment account transaction is provided, at 1014, then, through the illustrated interactions in FIG. 10 (at steps 1-3). And, at 1016, the biometric reader 114 transmits an authorization request associated with the transaction to the issuer 106 (e.g., via the payment network 104 shown in FIG. 1, etc.). Upon receipt, the issuer 106 determines whether to approve or decline the transaction, and transmits an authorization reply to the biometric reader 114 (e.g., via the payment network 104, etc.). A transaction complete notification is also transmitted to the backend 124.

In addition in this example, at 1018, the issuer 106 suspends the token with the token service provider 122 (i.e., after the first transaction in this example). In turn, the token service provider 122 notifies, at 1020, the backend 124 of the suspension of the token.

In response, the backend 124 notifies, at 1022, the user 110 that an identity check and verification (ID&V) is required for the user 110 to use the token in subsequent transactions. The user 110, in turn, requests to perform the identity check and verification, at 1024 (e.g., via a request for the identity check and verification with a URL, etc.). It should be appreciated that the request may be immediately after receipt by the user 110, or at some later time.

In this example embodiment, the backend 124 initiates an identity check and verification via the issuer 106, for example, through a one-time-passcode (OTP), 3DS (as in method 1000), challenge question to the user 110, or otherwise, etc. whereby the issuer 106 is satisfied that the user 110 is associated with the provisioning of the token, and that the user 110 is authorized to do so. At 1026, then, the issuer 106 un-suspends the token with the token service provider 122, and at 1028, the token service provider 122 confirms the us-suspension of the token with the backend 124 (whereby the token is available for use in biometric transactions by the user 110).

Conversely, again, when the response from the issuer 106 is red, from step 1002, the backend 124 indicates, at 1030 or 1032, that the payment device 112 (or payment account associated therewith) does not support biometric provisioning (or other provisioning requested) as generally described above (e.g., in method 900, etc.).

FIG. 11 illustrates another example method 1100 relating to provisioning of a token associated with an account. The method 1100 is described in connection with the example system 100 and the backend 124 included therein, and the example computing device 200. However, it should be appreciated that the method 1100 is not limited to the system 100 or the computing device 200, but may be implemented in a variety of different systems and/or payment devices and/or computing devices. Likewise, the systems, the payment devices, and the computing devices described herein should not be understood to be limited to the example method 1000, or other methods described herein.

More particularly, the method 1100 relates to a suspension of the token, by the token service provider 122, as a manner of controlling of the token when provisioned as described herein (and otherwise). It should be appreciated that in the method 1100, initially, registration is performed between the backend 124 and the token service provider 122 (as indicated at steps 1 and 1.1 in method 1100), whereby the biometric reader 114 of the merchant 102 (and the terminal 108 (e.g., including the dongle, etc.)) are registered as device(s) associated with provisioning tokens for biometric identity transactions (e.g., via the exchange of public/private keys, identifiers, etc.).

As such, at 1102 (as represented by steps 2 through 3.1.1.2 in FIG. 11), a token eligibility check (e.g., a token eligibility request, etc.) for the payment device 112 is performed consistent with, for example, the initial steps of method 800, but based, at least in part, on an application instance ID, etc., whereby the issuer 106, and then the token service provider 122, provides a response including a red or green indicator (or other suitable indicator) indicating that the payment device 112 is ineligible or eligible, respectively, for tokenization, etc. When the response is green (e.g., at step 2.2.2, etc.) and the payment device 112 is eligible for tokenization, the backend 124 provides an instruction to the biometric reader 114 for the user 110 to present a biometric to the biometric reader 114. As described in the method 800, the biometric reader 114, in turn, displays the instruction, whereupon the user 110 presents the biometric to the biometric reader 114. The biometric reader 114 collects the biometric data and submits the biometric data to the backend 124. The backend 124 processes the biometric data, for example, by digitizing the biometric data and storing the digitized biometric data in memory (e.g., the memory 204, etc.). The backend 124 provides the digitized biometric data to the token service provider 122 and the token service provider 122 submits a tokenization request (TAR) to the issuer 106 (e.g., a request for use of the payment account in biometric transactions, etc.). The issuer 106 then validates the request and, when validated, decides to permit the payment account credential to be tokenized. In doing so, the issuer 106 may also identify or classify the validation, for example, as red, green, or yellow, etc., based on a corresponding score (e.g., a fraud score, etc.) for the transaction (e.g., as determined by the backend 124, the token service provider 122, or another party, etc.), and transmit the same to the token service provider 122 and the backend 124.

In the method 1100, when the response from the issuer 106 with regard to permitting the payment credential to be tokenized is either green or yellow, for example, the backend 124 provides an instruction, at 1104, for the user 110 to proceed in transactions (or at least a first transaction, for example, depending on a number of session keys provided by the token service provider 122). In addition, the backend 124 instructs, at 1106, the token service provider 122 to provision a token for the payment account credential. And, the token service provider 122, in turn, provisions the token and the token profile (also at 1106) to the backend 124. The backend 124 then replenishes the token, at 1108, and the token service provider 122 responds with one or more sets of session keys for the token, at 1110. The backend 124 then stores the token and session key(s) in association with the biometric data for the user 110. In connection with replenishing the token, the backend 124 may communicate with the token service provider 122 via an API call to thereby obtain, retrieve, receive, etc. the session key(s).

Next, the backend 124 (in response to the purchase request) provides, at 1112, the token, or more broadly, the profile data, to the biometric reader 114 for use in a first transaction. As noted above, the biometric reader 114 may be included in the terminal 108, or not. In the method 1100, the terminal 108 is associated with a dongle (as shown in FIG. 11), which provides for communication between the biometric reader 114 and the terminal 108. The payment account transaction is provided, at 1114, then, through the illustrated interactions in FIG. 11 (at steps 1-3 and, for example, utilizing the session keys provided by the token service provider 122, etc.). Consistent therewith, at 1116, the biometric reader 114 transmits an authorization request associated with the transaction to the payment network 104, associated with the token service provider 122. The token service provider 122 converts the token included in the authorization request to the FPAN for the user's account, and transmits the authorization request on to the issuer 106 (with the FPAN), at 1118. Upon receipt, the issuer 106 determines whether to approve or decline the transaction, and then, transmits an authorization reply to the biometric reader 114 (e.g., via the payment network 104, etc.).

In this example embodiment, following the first transaction, when the response from the issuer 106 (at 1102) is green, the user 110 may subsequently use the token in a further biometric transaction depending, for example, on a number of session keys provided by the token service provider 122 in connection with replenishing the token at steps 1108 and 1110 (e.g., where the token service provider 122 provided three sets of session keys, four sets of session keys, five sets of session keys, etc.).

However, following the first transaction, when the response from the issuer 106 (at 1102) is yellow (or other color indicative of the first transaction) (and not green), the token service provider 122 deactivates or suspends, at 1120, the token for the user 110 (associated with the payment device 112) (i.e., after the first transaction in this example). Also, the token service provider 122 notifies, at 1122, the backend 124 of the deactivation of the token. A transaction complete notification is provided to the biometric reader 114 (from the terminal 108 or dongle, as appropriate, for the first transaction), and the dongle notifies the user of the completed first transaction, at 1124, and the biometric reader 114 notifies, at 1126, the backend 124 of the completed first transaction.

In response, the backend 124 further notifies, at 1128, the user 110 that an identity check and verification is required for the user 110 to use the token in subsequent biometric transactions (e.g., via a request for the identity check and verification with a URL, etc.). The user 110, in turn, requests to perform the identity check and verification, at 1130. It should be appreciated that the request may be immediately after receipt of a notice from the backend 124 by the user 110, or at some later time. In this example embodiment, in response to a notice from the backend 124, or otherwise, the token service provider 122 generates a one-time passcode (OTP) or other suitable code, at 1132, and passes the code to the user 110 (e.g., to a communication device associated with the user 110, etc.) (e.g., SMS message, email, application notification, etc.). The user 110 provides the code to the backend 124 (e.g., via an application associated with the backend 124, etc.), at 1134, and the backend 124 provides, at 1136, the code to the token service provider 122.

In turn, the token service provider 122 matches, at 1138, the code from the user 110 with the code generated at 1132. When the codes match, the token service provider 122 activates or un-suspends or un-blocks the token, at 1140. Then, at 1142, the token service provider 122 notifies the issuer 106 (and potentially, the backend 124) of the token being active. It should be appreciated that the OTP or code is one example of an identity check and verification. Alternatively, as shown in FIG. 11, the token service provider 122 may rely on the issuer 106 to perform the identity check and verification, and expose an API to report the result. Specifically, at 1144, the issuer 106 calls an API of the token service provider 122, to notify the token service provider 122 that the identity check and verification for the token is complete and successful. The token service provider 122 activates or un-suspends the token, at 1146, and potentially, notifies the issuer 106 and/or the backend 124, as desired or necessary. Regardless, the token may then be replenished, as generally described above, and additional sets of session keys provided for the token.

Again, conversely, when the response from the issuer 106 is red in the method, from step 1102, the backend 124 indicates, at 1148 or 1150, that the payment device 112 (or payment account associated therewith) does not support biometric provisioning (or other provisioning requested), again as generally described above (e.g., in method 900, etc.).

In some implementations of the method 1100, in replenishing the token in connection with the first transaction (e.g., at steps 1108-1110, etc.), the token service provider 122 may provide only one set of session keys for the token to the backend 124 (e.g., at step 1110, et.), whereby the token may be used only once in the first transaction (regardless of whether the issuer 106 identifies the transaction as green or yellow at step 1102). Here, after the single use of the token in the first transaction, the token is automatically inactivated (or blocked) until an identity check and verification is performed for the user 110 (e.g., as described at steps 1128-1146 of method 1100, etc.). If the user 110 attempts to re-use the token and/or the payment device 112 prior to the identity check and verification, the terminal 108 (and/or the backend 124) may provide an error message to the user 110 indicating that authentication is required. What's more, as only one set of session keys for the token is provided to the backend 124 (and the token is therefore implicitly blocked following the first transaction using the token), additional steps of deactivating the token (e.g., step 1120 in method 1100, etc.) and notifying the backend 124 of the deactivation of the token (e.g., step 1122 in method 1100, etc.) following the first transaction may not be required.

In connection therewith, in these implementations, the identity check and verification of the user 110 may be performed in the same manner described above at steps 1128-1146. For instance, following the first transaction (or in response to a subsequent attempted transaction), the backend 124 may notify the user 110 that the identity check and verification is required for the user 110 to use the token in subsequent transactions. And, the user 110 may then request to perform the identity check and verification (e.g., at the terminal 108, at an application of a communication device associated with the user 110, etc.). In turn, the backend 124 may notify the token service provider 122 that the identity check and verification is to be performed, and the token service provider 122 may generate a one-time passcode (OTP) or other suitable code and passes the code to the user 110 (e.g., to a communication device associated with the user 110, etc.). In response, the user 110 may provide the code to the backend 124 (e.g., via the terminal 108, via an application associated with the backend 124, etc.), and the backend 124 may provide the code to the token service provider 122. The token service provider 122 may then match the code from the user 110 with the code originally generated. When the codes match, the token service provider 122 may activate or un-suspend or un-block the token. In turn, the token service provider 122 may notify the issuer 106 (and potentially, the backend 124) of the token being active. The token may then be replenished, as generally described above, and additional sets of session keys provided for the token whereby the token may be used in subsequent transactions.

With that said, it should be appreciated that one or more of the operations of methods 300-1100 may be utilized in other ones of the methods 300-1100. In addition, it should be appreciated that the methods 300-700 (of FIGS. 3-7) may be implemented in connection with one or more of the methods 800-1100 (of FIGS. 8-11) (broadly, models as referenced to in FIGS. 3-7). As such, it should be appreciated that the methods 300-1100 are not mutually exclusive, but instead may be integrated in various embodiments.

It should further be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by one or more of: (a) receiving, at a computing device, a request to provision a biometric for biometric transactions to a payment account, the request including at least one of a cryptogram associated with a transaction to said payment account and a transaction ID for the transaction to said payment account; (b) checking, by the computing device, whether the payment account is supported for biometric transactions with an issuer of the payment account, whereby the issuer verifies the cryptogram and/or the transaction ID; (c) receiving, from the issuer, by the computing device, an indicator of eligibility of the payment account; (d) requesting, by the computing device, a biometric from the user, via a biometric reader; (e) in response to the request, receiving, by the computing device, biometric data indicative of a biometric of the user; (f) transmitting, by the computing device, a request to enable biometric transactions for the payment account, the request including a payment account number for said payment account, whereby the issuer verifies the request based on verification of the cryptogram and/or the transaction ID; and (g) based on a response from the issuer, notifying, by the computing device, the user that the payment account is enabled for biometric transactions.

As will be appreciated based on the foregoing specification, the above-described embodiments of the disclosure may be implemented using computer programming or engineering techniques including computer software, firmware, hardware or any combination or subset thereof, wherein the technical effect may further be achieved by one or more of: (a) receiving, at a computing device, from a payment network, a request to check whether a payment account of a user is supported for biometric transactions based on presentment of a payment device associated with the payment account, the request including at least one of a cryptogram associated with a transaction to said payment account and a transaction ID for the transaction to said payment account; (b) verifying, by the computing device, the payment account is supported for biometric transactions based, at least in part, on the at least one of the cryptogram and the transaction ID being included in a prior transaction; (c) transmitting, by the computing device, to the payment network, an indicator of eligibility of the payment account; (d) receiving, by the computing device, a request for provisioning of a biometric of the user to the payment account, the request including a payment account number for said payment account; (e) verifying the request based, at least in part, on the prior verification of the at least one of the cryptogram and the transaction ID being included in a prior transaction; and (f) transmitting, by the computing device, a response indicating an approval, or not, for enabling biometric transactions, whereby the payment network notifies the user of the payment account being enabled for biometric transactions.

With that said, example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for enabling use of an account in biometric transactions, the method comprising:
   receiving, at a computing device, a request to provision a biometric of a user for biometric transactions to a payment account, based on an Europay, Mastercard, and Visa (EMV)-enabled card interacting with a terminal, the request including a funding payment account number (FPAN) for the payment account, an expiration date for the EMV-enabled card and a cryptogram generated by the terminal based on one or more session keys and associated with a transaction to said payment account;
   checking, by the computing device, based on the FPAN and the cryptogram, whether the payment account is supported for biometric transactions with an issuer of the payment account;
   based on the payment account being supported for biometric transactions, receiving, from the issuer, by the computing device, an indicator of eligibility of the payment account for biometric transactions;
   in response to the indicator of eligibility of the payment account, requesting, by the computing device, a biometric from the user, via a biometric reader of the terminal;
   in response to the request for the biometric from the user:
      receiving, by the computing device, biometric data indicative of a biometric of the user;
      processing, by the computing device, and storing the biometric data; and then,
      transmitting, by the computing device, a request to enable biometric transactions for the payment account, the request including the FPAN for said payment account, whereby the issuer verifies the request to enable biometric transactions based on verification of the cryptogram; and
   based on a response from the issuer, notifying, by the computing device, the user that the payment account is enabled for biometric transactions.

2. The computer-implemented method of claim 1, wherein each of the indicator and the response from the issuer includes a color code.

3. The computer-implemented method of claim 1, further comprising generating, by the computing device, a fraud score for the transaction and transmitting the fraud score to the issuer; and
   wherein the response from the issuer is based, at least in part, on the fraud score for the transaction.

4. The computer-implemented method of claim 1, further comprising:
   provisioning a token for the payment account for use in biometric transactions; and
   associating the token with the processed biometric data for the user.

5. The computer-implemented method of claim 4, further comprising enabling and/or disabling the token based on an identity check and verification of the user.

6. The computer-implemented method of claim 4, further comprising disabling the token based on a number of session of keys provided for the token.

7. A computer-implemented method for enabling use of an account in biometric transactions, the method comprising:
   receiving, at a computing device, from a payment network, a request to check whether a payment account of a user is supported for biometric transactions based on presentment of an Europay, Mastercard, and Visa (EMV)-enabled card associated with the payment account to a terminal, the request including a funding payment account number (FPAN) for the payment account, an expiration date for the EMV-enabled card and cryptogram generated by the terminal based on one or more session keys and associated with a transaction to said payment account;
   verifying, by the computing device, the payment account is supported for biometric transactions based, at least in part, on the FPAN and the cryptogram being included in a prior transaction;
   based on the payment account being supported for biometric transactions, transmitting, by the computing device, to the payment network, an indicator of eligibility of the payment account for biometric transactions; and
   in response to the indicator of eligibility of the payment account:
      receiving, by the computing device, a request for provisioning of a biometric of the user to the payment account, the request including a payment account number for said payment account;
      verifying the request based, at least in part, on the prior verification of the FPAN and the cryptogram being included in the prior transaction; and then, transmitting, by the computing device, a response indicating an approval, or not, for enabling biometric transactions, whereby the payment network notifies the user of the payment account being enabled for biometric transactions.

8. The computer-implemented method of claim 7, further comprising:
provisioning a token for the payment account for use in biometric transactions; and
associating the token with the biometric of the user.

9. The computer-implemented method of claim 8, further comprising:
performing, by the computing device, an identity check and verification of the user; and
enabling and/or disabling the token based on the identity check and verification of the user.

10. The computer-implemented method of claim 7, wherein each of the indicator and the response indicating the approval, or not, for enabling biometric transactions includes a color code.

11. The computer-implemented method of claim 7, wherein the response indicating the approval, or not, for enabling biometric transactions is based, at least in part, on a fraud score for the transaction.

12. The computer-implemented method of claim 7, further comprising facilitating the transaction to the payment account, the transaction including the FPAN and the cryptogram.

13. A non-transitory computer-readable storage medium including executable instructions for enabling use of an account in biometric transactions, which when executed by at least one processor of a payment network, cause the at least one processor to:
receive a request to provision a biometric for biometric transactions to a payment account, based on an Europay, Mastercard, and Visa (EMV)-enabled card interacting with a terminal, the request including a funding payment account number (FPAN) for the payment account, an expiration data for the EMV-enabled card and a cryptogram generated by the terminal based on one or more session keys and associated with a transaction to said payment account;
check whether the payment account is supported for biometric transactions, or not, with an issuer of the payment account, based on the FPAN and the cryptogram;
based on the payment account being supported for biometric transactions, receive an indicator of eligibility of the payment account for biometric transactions;
in response to the indicator of eligibility of the payment account, request a biometric from the user, via a biometric reader of the terminal;
in response to the request, receive biometric data indicative of a biometric of the user;
process the biometric data;
transmit a request to enable biometric transactions for the payment account, the request including the FPAN for said payment account, whereby the issuer verifies the request based on verification of the cryptogram; and
based on a response from the issuer, notify the user that the payment account is enabled for biometric transactions.

14. The non-transitory computer-readable storage medium of claim 13, wherein the executable instructions, when executed by the at least one processor, further cause the at least one processor to generate a fraud score for the transaction and transmitting the fraud score to the issuer; and
wherein the response from the issuer is based, at least in part, on the fraud score for the transaction.

15. The non-transitory computer-readable storage medium of claim 13, wherein the executable instructions, when executed by the at least one processor, further cause the at least one processor to facilitate the transaction to the payment account, the transaction including the FPAN and the cryptogram.

* * * * *